(12) United States Patent
Kligman

(10) Patent No.: US 10,134,015 B2
(45) Date of Patent: Nov. 20, 2018

(54) ELECTRONIC CHECK-BASED PAYMENT SYSTEM AND METHODS FOR ISSUING, TRANSFERRING, PAYING AND VERIFYING ELECTRONIC CHECKS

(71) Applicant: MY PARTNERS AND GLOBAL STARS INVESTMENTS (MP & GSI) LTD, Road Town (VG)

(72) Inventor: Ilya Vladimirovich Kligman, St. Petersburg (RU)

(73) Assignee: MY PARTNERS AND GLOBAL STARS INVESTMENTS (MP & GSI) LTD, Road Town (VG)

( * ) Notice: Subject to any disclaimer, the term of this patent is extended or adjusted under 35 U.S.C. 154(b) by 439 days.

(21) Appl. No.: 14/368,722

(22) PCT Filed: Dec. 28, 2012

(86) PCT No.: PCT/RU2012/001137
§ 371 (c)(1),
(2) Date: Jun. 25, 2014

(87) PCT Pub. No.: WO2013/100824
PCT Pub. Date: Jul. 4, 2013

(65) Prior Publication Data
US 2015/0073986 A1  Mar. 12, 2015

(30) Foreign Application Priority Data
Dec. 30, 2011 (RU) .............................. 2011154492

(51) Int. Cl.
*G06Q 20/40* (2012.01)
*G06Q 40/02* (2012.01)
(Continued)

(52) U.S. Cl.
CPC ......... *G06Q 20/0425* (2013.01); *G06Q 20/10* (2013.01); *G06Q 20/40* (2013.01);
(Continued)

(58) Field of Classification Search
CPC .............................. G06Q 20/40; G06Q 40/02
(Continued)

(56) References Cited

U.S. PATENT DOCUMENTS 5,426,281 A  6/1995 Abecassis
5,677,955 A * 10/1997 Doggett ................. G06Q 20/02
235/379

(Continued)

FOREIGN PATENT DOCUMENTS

CA  2331476 A1 *  7/2001  ............. G06Q 20/40
CN  101571939 A  *  11/2009
(Continued)

OTHER PUBLICATIONS

Translation of Abstract CN101231727A Retrieved on http://worldwide.espacenet.com/publicationDetails/biblio;jsessionid=wyeg+5+RpLiqKRNjuhR3yrNIespacenet_levelx_prod_2?FT=D&date=20080730&Db=&&CC=CN&NR=101231727A&KC=A&ND=1&locale=en_EP.

(Continued)

*Primary Examiner* — Sara C Hamilton
(74) *Attorney, Agent, or Firm* — BCF LLP

(57) ABSTRACT

The invention relates to the sphere of information technologies, in particular, to electronic systems and monetary-fund circulation methods and can be used for solving problems of mutual settlements between participants of the electronic payment system in real-time mode. In doing so, the analogue of monetary funds in the invention presented are electronic bank bearer checks complying with bank regulations and the requirements of applicable legislation. The client application units are rendered as grouped into modules by categories corresponding to the user status determined by the unit of authorization of the client and server applications, with provision of the possibility of pre-setting a group of check circulation parameters for each category. The issue of checks is accompanied by the creation of legally-valid documents and reflection of transactions in the check register.

9 Claims, 12 Drawing Sheets

(51) Int. Cl.
*G06Q 20/04* (2012.01)
*G06Q 40/00* (2012.01)
*G06Q 20/10* (2012.01)
*G06Q 20/42* (2012.01)
*G06Q 30/04* (2012.01)

(52) U.S. Cl.
CPC ....... *G06Q 20/40145* (2013.01); *G06Q 20/42* (2013.01); *G06Q 30/04* (2013.01); *G06Q 40/00* (2013.01); *G06Q 40/02* (2013.01)

(58) Field of Classification Search
USPC ..................................... 705/44, 45; 235/379
See application file for complete search history.

(56) References Cited

U.S. PATENT DOCUMENTS

| | | | | |
|---|---|---|---|---|
| 5,905,976 A * | 5/1999 | Mjolsnes | ............... | G06Q 20/04 705/39 |
| 6,164,528 A * | 12/2000 | Hills | ............... | G06Q 20/04 235/379 |
| 6,757,664 B1 * | 6/2004 | Cardinal | ............... | G06Q 20/04 705/38 |
| 7,051,001 B1 * | 5/2006 | Slater | ............... | G06Q 20/02 705/26.1 |
| RE40,220 E * | 4/2008 | Nichols | ............... | G06Q 20/04 235/379 |
| 7,809,616 B1 * | 10/2010 | Orttung | ............... | G06Q 20/04 705/34 |
| 8,073,775 B1 | 12/2011 | Del Favero et al. | | |
| 8,332,329 B1 * | 12/2012 | Thiele | ............... | G06K 9/00442 705/64 |
| 8,374,963 B1 * | 2/2013 | Billman | ............... | G06Q 40/02 705/1.1 |
| 8,433,647 B1 * | 4/2013 | Yarbrough | ............... | G06Q 40/02 705/35 |
| 2001/0044764 A1 * | 11/2001 | Arnold | ............... | G06Q 20/04 705/35 |
| 2002/0026365 A1 * | 2/2002 | Natanzon | ............... | G06Q 20/02 705/16 |
| 2002/0103756 A1 * | 8/2002 | Andrews | ............... | G06Q 20/108 705/42 |
| 2002/0120846 A1 * | 8/2002 | Stewart | ............... | G06Q 20/04 713/168 |
| 2002/0138445 A1 | 9/2002 | Laage et al. | | |
| 2002/0178112 A1 * | 11/2002 | Goeller | ............... | G06Q 20/042 705/39 |
| 2003/0033252 A1 * | 2/2003 | Buttridge | ............... | G06K 17/00 705/45 |
| 2003/0050892 A1 * | 3/2003 | Clynes | ............... | G06Q 20/042 705/45 |
| 2003/0121966 A1 * | 7/2003 | George | ............... | G06Q 20/04 235/375 |
| 2003/0183689 A1 * | 10/2003 | Swift | ............... | G06Q 20/02 235/380 |
| 2004/0111371 A1 * | 6/2004 | Friedman | ............... | G06K 17/00 705/42 |
| 2004/0148258 A1 * | 7/2004 | Tillett | ............... | G06Q 30/04 705/42 |
| 2004/0181485 A1 * | 9/2004 | Finch | ............... | G06Q 20/042 705/45 |
| 2005/0097050 A1 * | 5/2005 | Orcutt | ............... | G06Q 20/042 705/45 |
| 2005/0144131 A1 * | 6/2005 | Aziz | ............... | G06Q 20/04 705/42 |
| 2006/0106717 A1 * | 5/2006 | Randle | ............... | G06Q 20/04 705/45 |
| 2006/0112013 A1 * | 5/2006 | Maloney | ............... | G06Q 20/04 705/45 |
| 2006/0116961 A1 * | 6/2006 | Kopko | ............... | G06Q 20/108 705/42 |
| 2006/0136332 A1 * | 6/2006 | Ziegler | ............... | G06F 21/31 705/39 |
| 2006/0161501 A1 * | 7/2006 | Waserstein | ............ | G06Q 20/042 705/65 |
| 2006/0182331 A1 * | 8/2006 | Gilson | ............... | G06Q 20/04 382/137 |
| 2007/0175977 A1 * | 8/2007 | Bauer | ............... | G06Q 40/02 235/379 |
| 2007/0214086 A1 * | 9/2007 | Homoki | ............... | G06Q 20/00 705/45 |
| 2007/0244815 A1 * | 10/2007 | Hawkins | ............... | G06Q 20/04 705/45 |
| 2007/0288380 A1 * | 12/2007 | Starrs | ............... | G06Q 20/042 705/45 |
| 2007/0299775 A1 * | 12/2007 | Algiene | ............... | G06Q 20/042 705/45 |
| 2008/0071683 A1 * | 3/2008 | Hayden | ............... | G06Q 20/042 705/45 |
| 2008/0071684 A1 * | 3/2008 | Marshall | ............... | G06Q 20/042 705/45 |
| 2008/0306839 A1 * | 12/2008 | Starrs | ............... | G06Q 20/042 705/27.1 |
| 2009/0182665 A1 * | 7/2009 | Reid | ............... | G06Q 20/04 705/45 |
| 2009/0204540 A1 * | 8/2009 | Hawkins | ............... | G06Q 20/04 705/45 |
| 2009/0263004 A1 * | 10/2009 | Hawkins | ............... | G06Q 20/04 382/139 |
| 2009/0307136 A1 * | 12/2009 | Hawkins | ............... | G06Q 20/04 705/45 |
| 2010/0063928 A1 * | 3/2010 | Hart | ............... | G06Q 20/0425 705/44 |
| 2010/0205090 A1 * | 8/2010 | Fellerman | ............... | G06Q 20/04 705/40 |
| 2010/0205095 A1 * | 8/2010 | Ostrovsky | ............... | G06Q 20/04 705/44 |
| 2010/0262538 A1 * | 10/2010 | Rosenberger | ........ | G06Q 20/102 705/40 |
| 2011/0218913 A1 * | 9/2011 | Regep, II | ............... | G06Q 20/40 705/44 |
| 2011/0258119 A1 * | 10/2011 | Al | ............... | G06Q 20/40 705/44 |
| 2011/0270755 A1 * | 11/2011 | Pinski | ............... | G06Q 20/04 705/44 |
| 2011/0320357 A1 * | 12/2011 | Gilson | ............... | G06Q 40/00 705/45 |
| 2011/0320358 A1 * | 12/2011 | Harris | ............... | G06Q 40/00 705/45 |
| 2012/0101946 A1 * | 4/2012 | Jones | ............... | G06Q 20/042 705/45 |
| 2012/0101947 A1 * | 4/2012 | Hawkins | ............... | G06Q 20/04 705/45 |
| 2012/0116972 A1 * | 5/2012 | Walker | ............... | G06Q 20/0425 705/44 |
| 2012/0136788 A1 * | 5/2012 | Krishna | ............... | G06Q 20/02 705/44 |
| 2012/0173436 A1 * | 7/2012 | Smith | ............... | G06Q 10/00 705/77 |
| 2013/0275302 A1 * | 10/2013 | Lee | ............... | G06Q 20/0425 705/42 |

FOREIGN PATENT DOCUMENTS

| | | | |
|---|---|---|---|
| EP | 0844577 A2 | 5/1998 | |
| EP | 1316903 A1 | 6/2003 | |
| RU | 2337401 C2 | 10/2008 | |
| WO | 1996009592 A1 | 3/1996 | |
| WO | 2005059795 A1 | 6/2005 | |
| WO | WO 2006039364 A2 * | 4/2006 | ............. G06F 21/31 |

OTHER PUBLICATIONS

Translation of Abstract CN101986336A Retrieved on http://worldwide.espacenet.com/publicationDetails/biblio?CC=CN&NR=101986336A&KC=A&FT=D
International Search Report PCT/RU 2012/001137 dated Jun. 27, 2013.

(56) References Cited

OTHER PUBLICATIONS

English Abstract of JP2005056440 retrieved on Espacenet on Jul. 12, 2017.
Office Action with regard to the AE counterpart Patent Application No. P707/14 dated Jul. 11, 2017.
English Abstract of corresponding document WO9704411 (A1) for KR100423371 retrieved on Espacenet on Jul. 12, 2017.

* cited by examiner

ELECTRONIC CHECK-BASED PAYMENT SYSTEM AND METHODS FOR ISSUING, TRANSFERRING, PAYING AND VERIFYING ELECTRONIC CHECKS

FIELD OF THE INVENTION

The invention relates to the sphere of information technologies, in particular, to electronic systems and monetary fund circulation methods and can be used for solving problems of mutual settlements between participants of the electronic payment system in real-time mode. In doing so, the analogue of monetary funds in the invention in question are electronic bank bearer checks complying with bank regulations and the requirements of applicable legislation.

BACKGROUND OF THE INVENTION

Electronic payment systems that use electronic checks for solving mutual settlement problems are well-known. In particular, the CyberCheck system, which uses electronic checks as a means of payment for goods and services has become commonplace. In this system, a check is only used for the execution of payment operations and is only generated after its signing by the users, which does not ensure the full scope of monetary fund circulation, considerably narrows settlement system capabilities and creates prerequisites for issuing uncovered checks.

Also familiar is the NetChex system, which is a conditionally electronic payment system. In this system, the customer's order to issue a check is only received in electronic form, and the check is to be sent to the supplier of services/goods in paper form, which also narrows settlement system capabilities and significantly complicates the check circulation process.

The use of Paymer digital checks for settlement purposes is also well-known. In the implementation of this system, information about checks upon their circulation is stored in documented form in hard copy, and the execution of transactions by means of checks between system users is possible both in electronic form and in hard copy. At that, checks are not referenced to a particular owner, whereby the problem of "joint possession" of a check arises. It is evident that this system does not permit excluding risks in implementing electronic mutual settlements and does not ensure the transparency of all electronic check processing operations.

SUMMARY OF THE INVENTION

The goal of this invention is to provide an electronic monetary system supporting electronic mutual settlements between its participants in real-time mode with the use of electronic analogues of bank checks, providing its participants with a high level of security and the possibility of obtaining a full, legally-valid documentary database on all transactions executed by the participants in the system.

The technical result to be achieved by the invention involves the creation of a multifunctional electronic check circulation system as well as the security enhancement of mutual settlements with the use of electronic checks ensured by both engineering means and methods of electronic check record-keeping, verification of the authenticity of electronic checks and the authentication of system participants, and by ensuring a full cycle of electronic check circulation including methods of the issue and payment of electronic checks and the execution of electronic check transfers.

For achievement of the aforementioned technical result, an electronic check settlement system is used containing at least one server computer device for data-handling and storage, including a server application, and at least one client computer device for data-handling, including firmware client modules ensuring the possibility of connection of the client computer device to the server device over Internet network communication channels and the protection of communication channels by firmware means of server and client modules with the use of encryption and electronic digital signature. In doing so, the electronic settlement system for electronic checks in question differs from the prototype in that the client and server applications contain at least interconnected units of user authorization in the system being interconnected, a unit for the updating and synchronization of client and server application data, as well as a parameter-input unit for the execution of transfers and storage of information about client-application payments related by firmware with units for verification of the parameters of electronic check transfers connected to the unit of authorization and verification of user parameters and a unit for the registration and execution of server-application electronic check transfers connected by feedback channels to units for electronic check management, check depositing, commissions, and the sending of notices to the user in real-time mode connected to a unit for the updating and synchronization of client-application data, as well as the inclusion of an electronic-signature unit in the composition of the client application, which is connected by firmware to the unit for the generation and storage of digital documentation of the server application connected to the unit for the registration and execution of electronic check transfers; at that, the electronic check management unit of the server application is connected by firmware over the feedback channels to interconnected units for the registration of electronic check transactions connected to the electronic check signature unit.

In doing so, the client application units are grouped into modules by categories corresponding to the user status determined by the authorization unit of the client and server applications, with provision of the possibility for pre-setting a group of check circulation parameters for each category.

In particular, the system provides three categories of users—the initial category with a minimum set of check circulation parameters (in operating mode, when the transfer of electronic checks in the standard user category as well as those of the bank are performed via a dealer (broker)—the initial category is used exclusively for registration and the sending of an application for changing status (user category)); the standard category—requiring the presentation of additional data on the participant and enabling the participant to present checks for payment to the bank and select a paying bank for its checks; and the extended category—having the widest set of functional capabilities, intended for the operation of the Issuer, Partner-Banks and Dealers (Brokers) of the system, with provision of the possibility of generating an additional set of check circulation parameters for each category. In doing so, in order to take part in the system as a legal entity, the customer shall be assigned to the standard or extended category, which can only be obtained in the course of completing the corresponding status change procedure, which guarantees the execution of all of the organization's necessary checks.

The technical result is also achieved by the fact that methods are proposed for the payment, issue, transfer and verification of electronic checks with the use of the aforementioned payment system.

In doing so, the method for implementing electronic check transfers, including the stage of user-data input and its authorization in the system as well as the input of transfer data differs in that it allows check transfer in real-time mode in accordance with the limitations presented in the electronic check record-keeping method and includes the following stages: authorization in the System; receipt of account data; input of electronic check transfer parameters; verification of electronic check parameters; registration of requests for the implementation of electronic check transfer; transactions involving the sender's check exchange into several checks (transfer check, commission check, new balance check), including the presentation of checks for payment, the payment and issue of new checks; the placement of electronic check commissions in the Operator's account or in system operation mode when transferring electronic checks of the standard user category as well as those of the bank via a dealer (broker)—to the Dealer's (Broker's) account; placing the electronic check in the Payee's account; transactions involving the payee's exchange of checks into a single check (in cases where the payee has a balance in its account), including the presentation of checks for payment; finalization of transfer to be accompanied by the creation and signature of electronic documents, and participant notification of transfer execution. This method for implementing electronic check transfers is accompanied by the creation of all of the necessary legally-valid documents, with all completed actions reflected in the check register.

The method for the issue of electronic checks provided by the invention only allows for the issuance of electronic checks following the completion of mandatory stages by several user categories. The method of issue includes mandatory stages of the generation of a check-issue request by the issuer, as well as the bank's verification of money depositing in the issuer's settlement account (security for the issued check), conformity with request parameters and the bank's confirmation of electronic check issuance. Independent issue by a single participant is not possible. Issuance is accompanied by the creation of legally-valid documents and the reflection of transactions in the check register.

The method of electronic check payment also includes several stages and requires the obligatory participation of several user categories. The method includes the stages of the customer's sending an application to the bank for payment of the check; the bank's verification of the details specified in the application and the possibility of check payment; the bank's transfer of the invoice to the customer for placing the check; transfer of the check to be presented for payment to the bank by the customer, by means of payment of the issued invoice; the bank's sending of a request to the issuer for verification of the check; the issuer's verification of the check presented for payment; the issuer's confirmation of the request by sending a verification notice; and the implementation of check payment.

Figure 1:
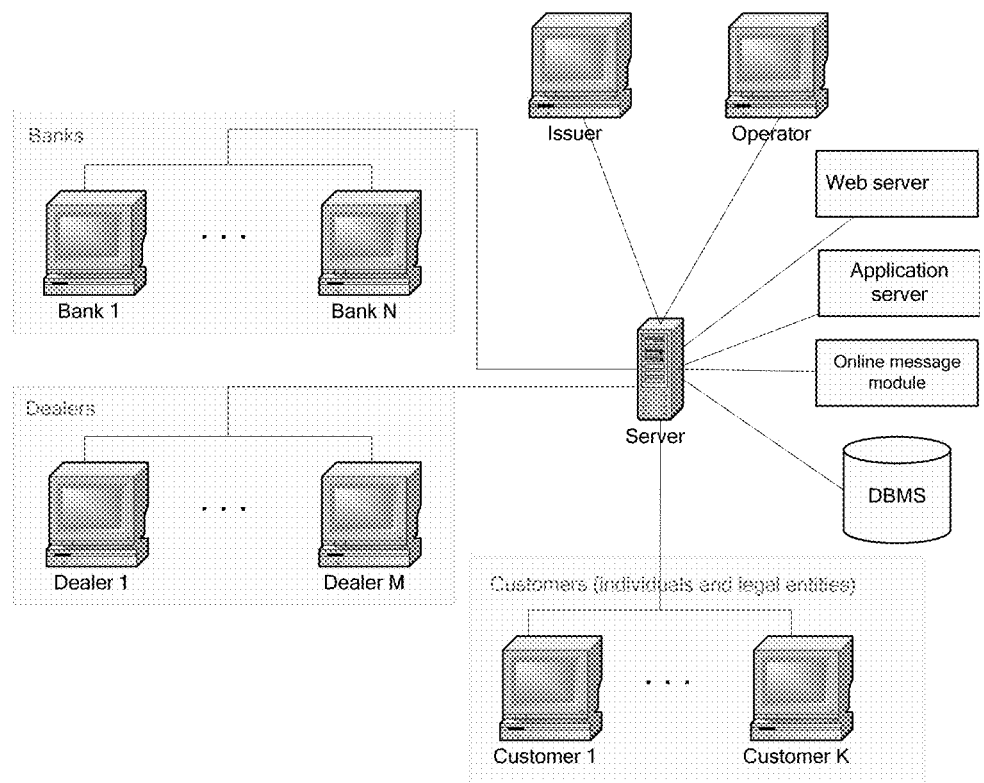
FIG. 1 Schematic diagram of the System, which uses methods relating to the invention.

The following designations are used in the aforementioned illustrative diagrams:

K1—client unit for registration in the system (KB R)
K2—client unit for authorization in the system (KB A)
K3—client unit for data update, synchronisation of the client and server application DBs (KB ODS)
K4—client unit for interaction with the server (KB VS)
K5—client unit for parameter input, implementation of transfers (KB VDVP)
K6—client unit for data input, sending of invoices for placing checks in an account (KB VDOS)
K7—client unit for data input, sending of applications for the purchase, sale of electronic checks (KB OZPPECh)
K8—client unit for data input, sending of applications for the payment of electronic checks (KB OZOECh)
K9—client unit for the processing of received electronic check transfers (KB OPPECh)
K10—client unit for the processing of invoices received for placing checks in an account (KB OPSZCh)
K11—client unit for the electronic signature of digital documentation (KB TsP)
K11 (Issuer)—client unit for data input, sending of requests for the issue of electronic checks (KBE OZVECh)
K12 (Issuer)—client unit for the processing of requests received for the verification of electronic checks (KBE OPZVFECh)
K13 (Bank)—client unit for the processing of requests received for the issue of electronic checks (KBB OPZVECh)
K14 (Bank)—client unit for the processing of applications received for the payment of electronic checks (KBB OPZOECh)
K15 (Bank)—client unit for data input, sending of requests for the verification of electronic checks (KBB VDOZVFECh)
K16 (Issuer)—client unit for the processing of applications received for the purchase of electronic checks (KBE OPZPECh)
K16 (Dealer)—client unit for the processing of applications received for the purchase of electronic checks (KBE OPZPECh)
K17 (Dealer)—client unit for the processing of applications received for the sale of electronic checks (KBD OPZPrECh)
S1—server unit for the registration, management of user accounts (SB RUUZP)
S2—server unit for the authorization and verification of user parameters (SB APPP)
S3—server unit for data update, synchronization of the client and server application DBs (SB ODS)

S4—server unit for the verification of electronic check transfer parameters (SB PPPECh)
S5—server unit for the registration and implementation of electronic check transfers (SB RVPECh)
S5—server unit for user account management (SB UUSP)
S6—server unit for the registration of applications, requests, invoices for placing checks in an account (SB RZZSZECh)
S7—server unit for electronic check management (SB UECh)
S8—server unit for the registration of electronic check transactions in the register (SB ROEChR)
S9—server unit for the generation of digital documentation (SB GTsD)
S10—server unit for the sending of online notices (SB OOU)
S11—server unit for the issue of electronic checks (SB VECh)
S12—server unit for the signature of electronic checks (SB PECh)
S13—server unit for the processing and execution of applications, requests (SB OIZZ)
S14—server unit for the write-off of electronic checks (SB SECh)

DETAILED DESCRIPTION OF THE EMBODIMENTS

This invention is aimed at providing an electronic check settlement system (a "System") between organizations and/or individuals in real-time mode. Technically, implementation of this System can involve at least one server computer device for data processing and storage, the server application comprising it and client computer devices for data processing with the client applications comprising them, which provide for interaction between the client computer devices and the server computer device. The interaction of client computer devices with the server is carried out using the Internet network over protected communication channels. The protection of communication channels is provided by means of server and client applications with the use of encryption and electronic digital signature algorithms.

The methods provided herein are expressed in the corresponding operating algorithms of the server and client computer devices. The conformity of the operation of the devices to the given algorithms is ensured by execution of the sequence of program instructions provided in the server and client applications. The architecture of the server device or set of devices shall be based on the use of one or several computers combined by a local area network and shall at least include the following modules: a database management system (DBMS), a web server (module providing for interaction with client applications via the Internet), an application server (module implementing main application logic and ensuring interaction with the DBMS), and a module of online messages (providing instant information to users about events within the System).

Client device architecture can be based on the following possible solutions of the client application: a separate client application with its own user interface (to be described hereinafter); a client application in the form of a module built into a standard tool for viewing Internet network resources (a web browser) with its own user interface to be reflected in the web browser (with the same units and interaction patterns as described hereinafter); in thin-client form based on the web browser, with the transfer of units for data processing and user interface generation to the server.

In thin-client mode, only data input in the web browser user interface, electronic signature of digital documentation, data encryption, data transfer to the server, data reception from the server, decryption, and output to the web browser user interface are processed on the client device. In doing so, in case of implementation of the client application in the form of a built-in module or thin client, the client device and the entire System as a whole have equal functional capabilities with the System in case of using a client device based on a separate client application with its own interface.

The System described above does not restrict any possible implementations of this invention.

Figure 2:
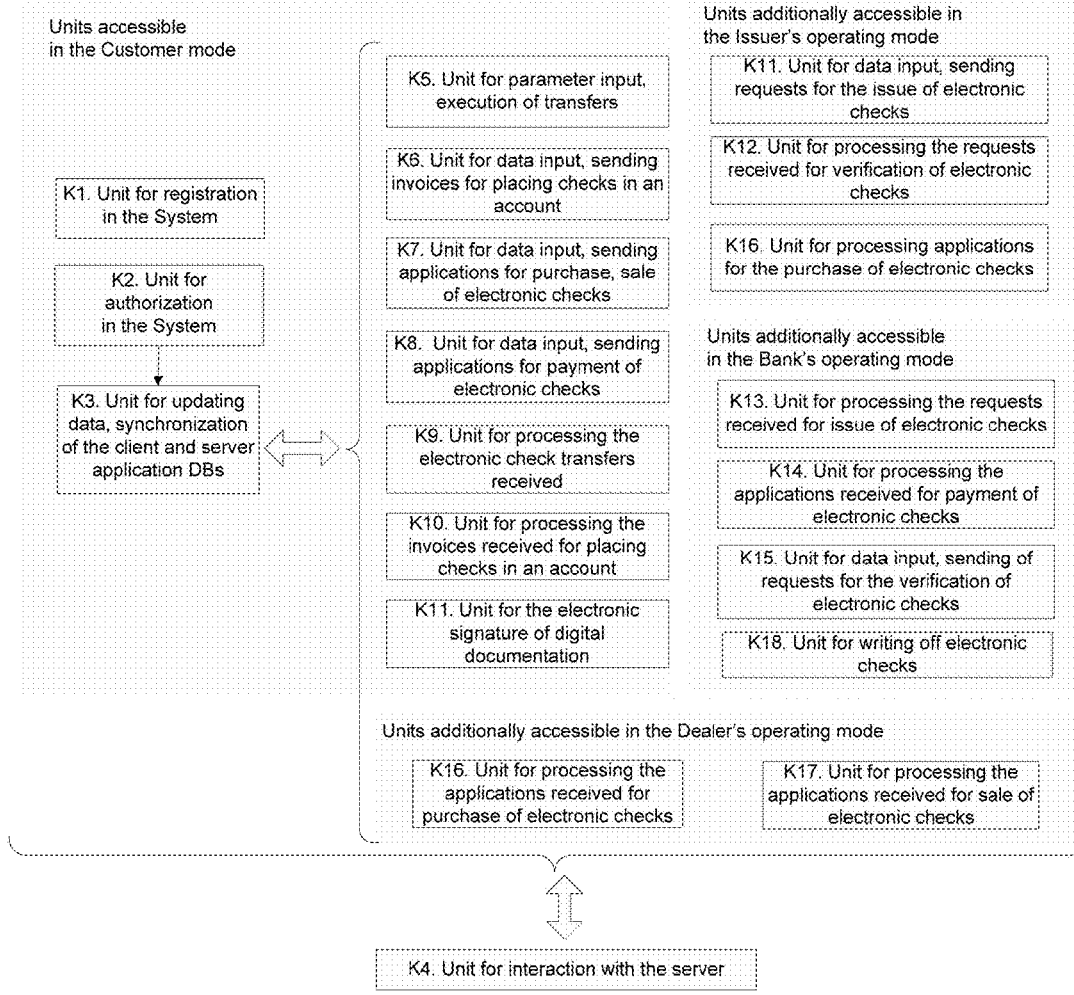
FIG. 2 Main units comprising the client application.
Figure 3:
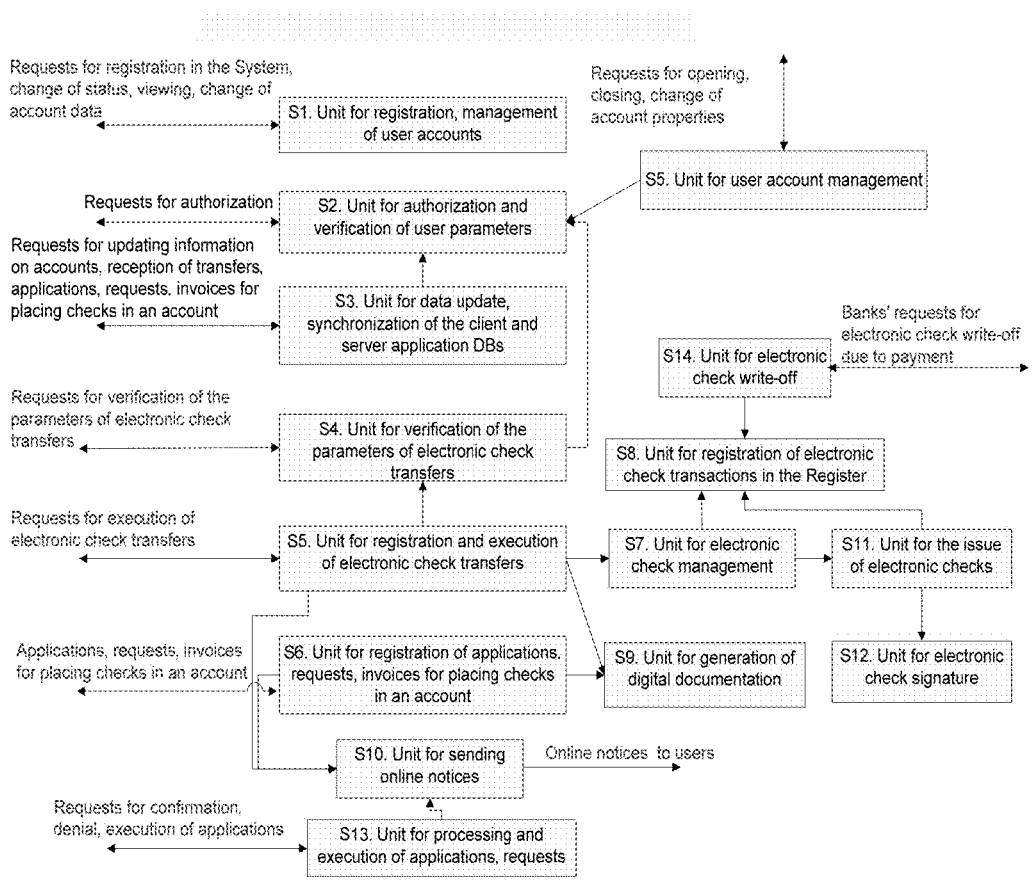
FIG. 3 Main units comprising the server application.

The structure of the client and server application in the form of functional units is given in FIGS. 2 and 3. In the System implementation under consideration, the client application has several operating modes, which are determined by the status of the user that has authorized in the System. Additional units are allocated in the form the Issuer, Bank, Dealer (Broker). The remaining units can be accessible in any operating modes (possible restrictions are determined by the peculiarities of specific System implementation). Implementations are possible in which there is more than one client application, in each of which the corresponding set of units is accessible.

Participant Categories

It is assumed that there are three main statuses of Participants in the System.

In doing so, the Participants shall be users (legal entities or individuals), with information about them presented in electronic form in the System database carrying out interaction with the System using client computer devices. The status causes a set of rights to be granted to the Participant whereby it obtains the possibility of execution of certain algorithms in the System and acquires access to a certain volume of information available in the System.

The initial status is the Participant level, which is limited as to the set of possibilities within the System, and does not require the provision of documents for confirmation of the information entered by the user upon registration. At the initial level, registration is only possible as an individual. A legal entity can only be registered in the System in case of transfer from initial level to standard level. In doing so, in system operating mode, when the transfer of the electronic checks of users with standard status as well as those of the bank is performed via a dealer (broker), the initial category is used solely for the registration and sending of a status request for change of status (user category).

Standard status is the level designed for authorized Participants of the system, whether individuals or legal entities. In order to obtain this status, the Participant is obliged to provide additional information about itself and a number of documents for its confirmation. This status enables the Participant to present checks to the Bank for payment and select the paying bank for its checks.

Extended status is the level designed for the operation of the Issuer, Partner-Banks and Dealers (Brokers) of the System.

In order to ensure operability of the methods presented in the invention, the following Participants shall be obligatorily registered in the System:
  Issuer—the organization on whose behalf the issue of electronic checks is performed;
  Operator—the owner of rights to the System ensuring its functioning;
  at least one Bank—a partner-bank, in which the monetary funds serving as the security for issued checks are placed in the Issuer's settlement account;

at least one Dealer (Broker)—a legal entity that executes electronic check purchase-and-sale transactions with the Participants on a permanent basis as well as the purchase of checks from the Issuer.

The Participants registered as the Bank, Dealer (Broker) can also act as customers and use standard system functionality.

An approximate diagram of a similar System is given in FIG. 1.

In order to acquire the corresponding status and obtain the possibility of working in the System, the Participant shall complete registration, which, depending upon the status requested, consists of a different number of stages. The first stage of registration in the System is performed by means of client application and includes the input of the participant's personal data, setup of safety parameters, familiarization with the offer agreement, and generation of electronic keys for EHS (equivalent handwritten signature). As a result of the first stage of registration, the Participant is assigned a unique registration number—a public key designed for EHS verification is registered with its name in the System server, and the Participant's data are recorded in the System database.

As a result of the first stage of registration, the user is assigned Initial status. In order to obtain Standard or Extended status, the Participant shall, via the System, generate an electronic application, in which it shall specify the category (individual/legal person) and enter all of the information requested. For confirmation of the entered information, the Participant shall provide duly-certified copies of documents. Only after successful completion of the document verification stage and, if necessary, entering into additional agreements (for the Bank, Dealer (Broker), Issuer), the Participant will be issued the requested status and provided with the corresponding set of rights within the System.

Participants with any status in the System can open an unlimited number of accounts expressed in the currency types supported by the System. Participants with a status greater than initial have the possibility of selecting the bank to serve as the paying bank for the check, whose nominal value is equal to the account balance. Upon the opening of an account, it will be assigned a unique number in the System, according to which the identification of the Participant can be performed unambiguously.

Electronic Checks

The equivalent of monetary funds in the System is electronic checks. An electronic check is a bearer check in non-documentary form and contains the following obligatory details:
  check number—unique identifier of the check;
  description of the "check" included in the document text and expressed in the language of the country in which the document has been drawn up;
  requirement to pay a certain amount (nominal value of the check);
  name of the paying bank;
  indication of the account from which payment shall be executed;
  indication of payment currency;
  indication of the date and place of check execution;
  Issuer's (check drawer's) signature.

A non-documentary form of checks shall be considered lawful and checks drawn up in such form deemed a valid payment instrument in accordance with the Bank of Russia Regulation "On Cashless Settlements in the Russian Federation," which predicates the peculiarities of the electronic check processing methods described below.

The electronic check is presented in the form of a DB record. Electronic check signature is presented in the form of EHS (equivalent handwritten signature) obtained as a result of the cryptographic conversion of check details using the Issuer's closed key and ensures electronic check protection against forgery while allowing identification of the check drawer and determination of the absence of information distortion in electronic checks.

The record-keeping of electronic checks is performed in Participants' accounts. Upon completion of check exchange operations, only one check, whose nominal value is the balance in the account, can be referenced to one standard customer's account in the System. For the purposes of the record-keeping of checks presented to the bank for payment, specialized accounts are used, in which several electronic checks can be placed simultaneously.

Electronic checks are characterized by the following states:
  The check is in circulation—a valid check is at the disposal of one of the system Participants;
  The check has been submitted for payment (to the paying bank);
  The check has been submitted for payment via collection;
  check has been paid.

A change in the state of the electronic check or change in the check owner can occur as a result of certain operations such as check issue, check transfer, check submission for payment, check submission for payment via collection, check payment, or collection of payment. All electronic check transactions shall be recorded in the check register and accompanied by the generation of legally-valid documents certified with the EHS of the corresponding parties.

Electronic checks have a limited period of validity, upon whose expiry they are automatically exchanged for equivalent checks with a new number and date of issue.

Method for the Implementation of Electronic Check Transfers

The method for the implementation of electronic check transfers presented here consists of a certain sequence of main stages of the process, whether obligatory or non-obligatory for execution. The obligatoriness of stages is determined by the fulfillment of certain conditions disclosed in the algorithms described below. The peculiarities of the implementation of the algorithms such as programming language, architectural particularities of the software implementing the method are not limited by the given invention.

The method assumes that the Participant's computer device is configured so that it allows for the execution of programmed instructions of the client application implementing the method and interaction with the server computer device via the Internet.

The beginning of implementation of the transfer process is the user's start-up of the client application, during which the K2 client unit for authorization in the System is initialized. In the course of execution of this unit, verification of the Participant's account and its investment with the rights corresponding to the respective status shall be carried out. For the execution of these operations, the K2 client unit through the K4 unit for interaction with the server connects with the S2 server unit for authorization and verification of user parameters. In doing so, in the K4 unit, when a command and the necessary data are received, the following will be performed: generation of a request in the required format, encryption, signature of request, establishment of connection with the server, transfer of the request (via the Internet over a protected communication channel) and processing of the reply. It is assumed that the interaction of all client units with server units is carried out through the K4 unit and shall not be mentioned further.

The implementation of the client and server authorization unit is not the subject of this invention and can include various combinations of well-known methods for the authentication and authorization of users.

Obligatory for these units is the verification of the Participant's account, accessibility and correctness of the storage of electronic keys, which further will be used for creating an equivalent handwritten signature (EHS) of requests and electronic documents as well as obtaining information about the status and corresponding rights of the Participant. On the basis of the Participant's status, the possibility is blocked for the Participant to carry out actions which are not provided for by its status; at that, blocking occurs both at the level of client application (absence of the corresponding user interface, execution of the algorithms of checks in the client application) and at the level of sever application (the server units comprising this application apply to the S2 unit in case of the processing of each request received in order to verify user status and other parameters).

The successful execution of the authorization unit guarantees that the Participant is not removed or blocked, its closed electronic key corresponds to the public key registered in the System.

Figure 4:
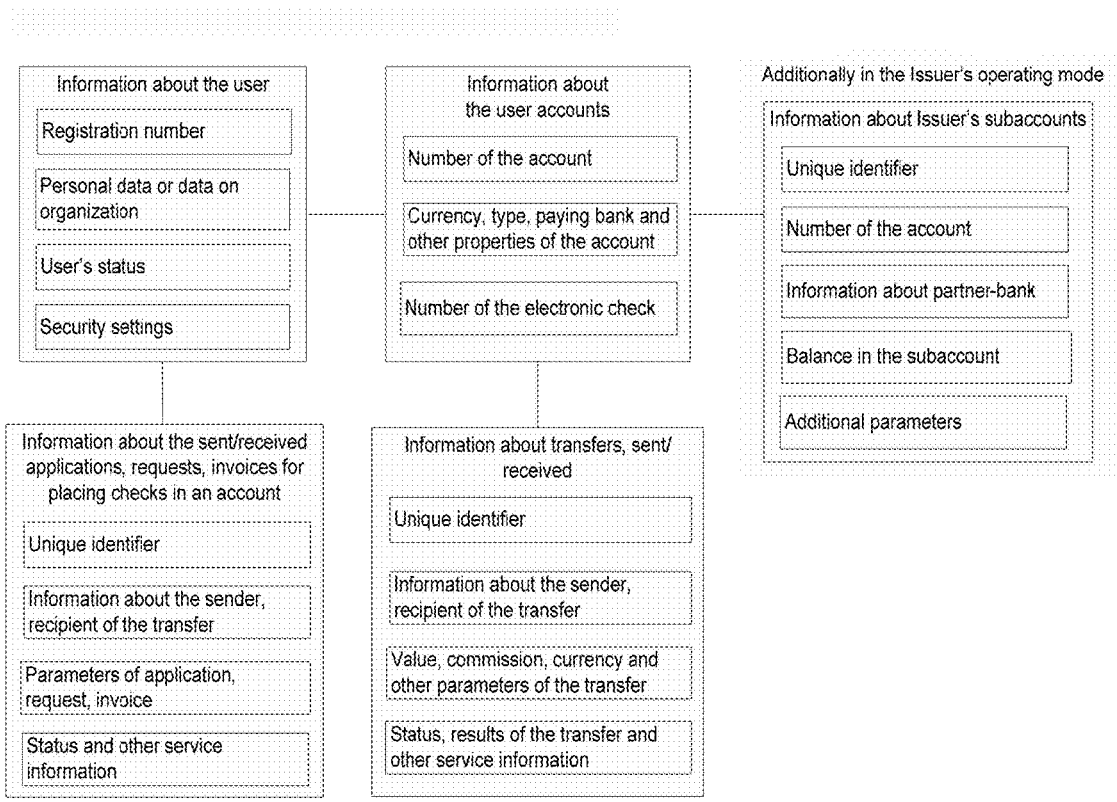
FIG. 4 Diagram of main client application DB sections.
Figure 5:
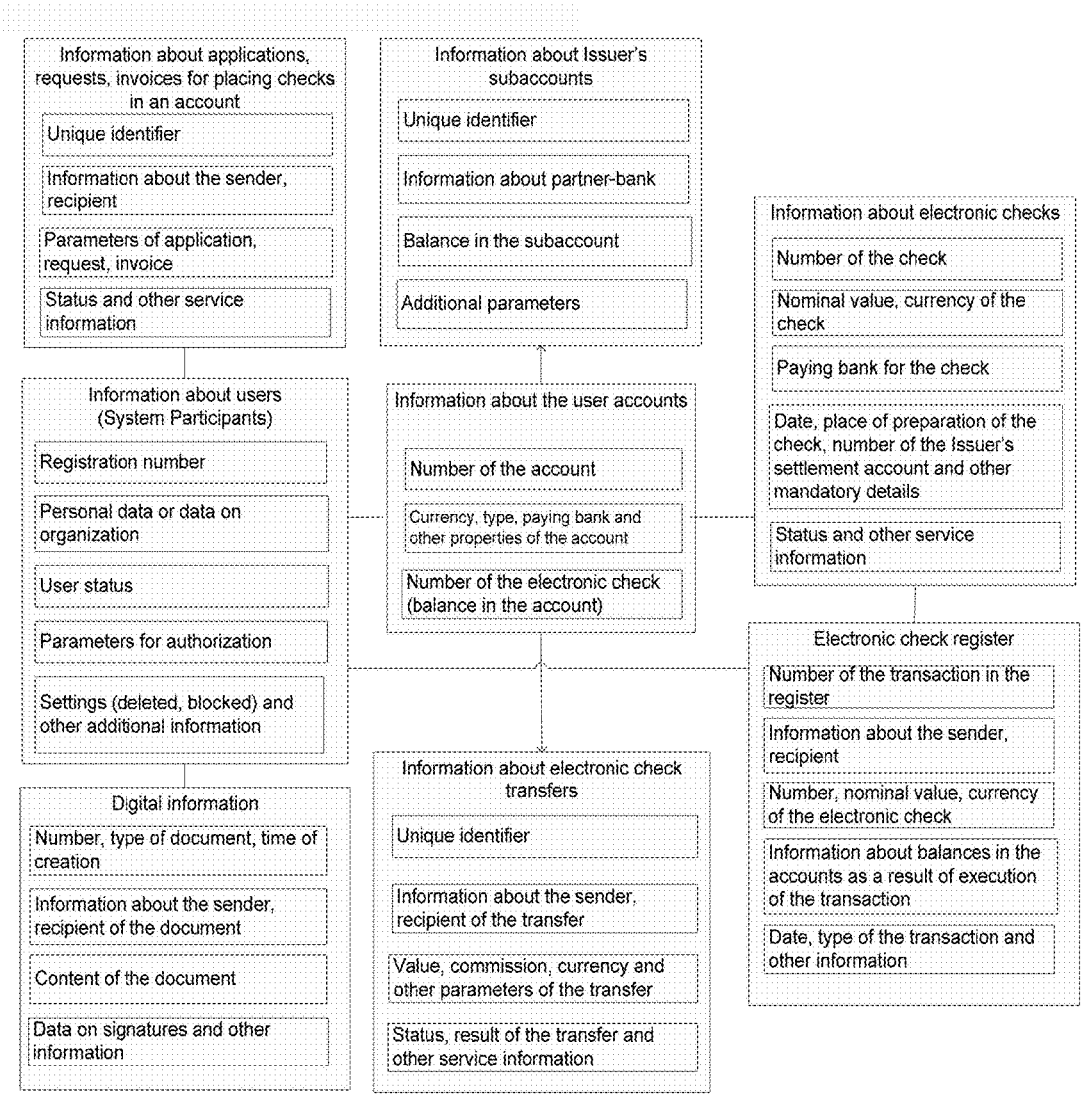
FIG. 5 Diagram of main server application DB sections.
Figure 6:
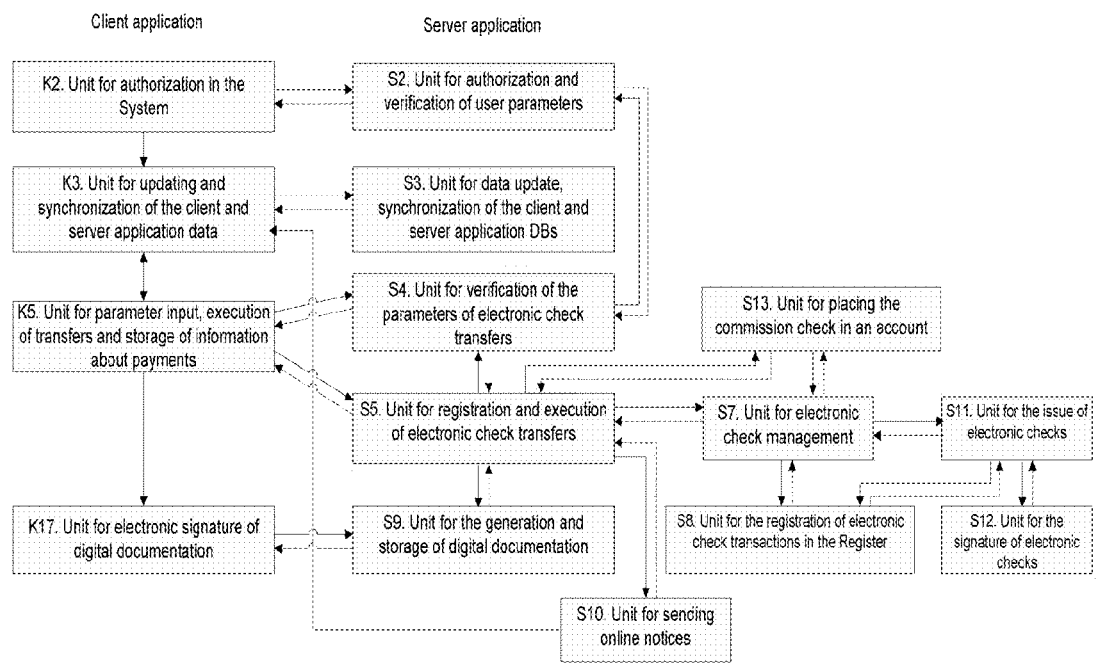
FIG. 6 Diagram of unit interaction in implementing electronic check transfers.

The successful execution of the authorization unit is an obligatory condition for transfer to the next K3 unit for updating, synchronisation of client and server application data. The client K3 unit communicates with the server S3 unit for data update, synchronization of client and server applications. In the course of the execution of K3, S3 units, information is received about the current state of Participant's accounts, transfers received, and invoices for check placement in an account. Depending upon the Participant's status, the corresponding types of applications, requests are received and their states are updated. The execution of these units shall guarantee the Participant's access to information on all transfers, invoices for placing checks in an account, applications, requests and other information, both sent and received by the Participant (for example, by means of synchronization of the client application database with the server application database). The methods of implementation of these units are well-known and are not the subject of this invention. As an example of System implementation, a version is considered whereby the information received from the server is stored in the local database, whose diagram is shown in FIG. 4.

After the successful completion of operation of the K3 unit, the application will display the information received in the user interface, including information about all customer's accounts: number, name of the account, active balance in the account, number of the electronic check referenced to the account, details of the bank associated with the account, etc. The volume of information to be received and displayed shall be determined by the System implementation version.

The successful execution of the S3 server unit and K3 client unit for updating, synchronization of client and server application data is an obligatory condition for transfer to the K5 unit for parameter input and the execution of transfers.

For initialization of this unit, the Participant shall select the corresponding section in the user interface of the client application.

The K5 unit enables the user to enter the required initial data for transferring the electronic check. This unit can provide various possibilities for entering transfer parameters: direct input of parameters (input of the payee's account, check amount receivable or check amount to be written off, purpose of payment), selection of the variants of parameters from the lists of possible values (selection from the list of the sender's private accounts, selection of the recipient's account number from the corresponding reference book), generation of transfer on the basis of the invoice received for placing the checks in an account or an application of a certain type (for example, application for the purchase of electronic checks). The latter variant is based on the use of information received in the course of execution of the K3 unit for updating, synchronization of client and server application data and stored in the application by the method corresponding to the specific implementation of the System (in the random-access memory or read-only memory of the computer device). The method of input of transfer parameters can include automatic validation to be performed in the course of parameter input, whereby the user will immediately be notified of any errors. The method can include automatic calculation of the amount of commission to be collected for the transfer in the course of reception of transfer amount data by the application. The calculation of commission can be carried out by the module on the basis of the local data of the application (to be stored in the random-access memory or DB, downloaded, for example, at the stage of reception of account data) or on the basis of the commission rate, to be downloaded from the server by means of a separate request. This possibility can be used for implementation of more complicated commission setup variants such as dependence of the commission rate upon the Participant's status in the group (in this case, in order to determine the commission, both data on the sender and data on the recipient of the transfer will be required), possibility of setup of the individual commission of the Participant, etc. After calculation of the commission, the module will notify the user about the sum of commission to be collected for the transfer and the sum to be written off (or sum receivable, depending upon the parameter filled in).

Figure 7:
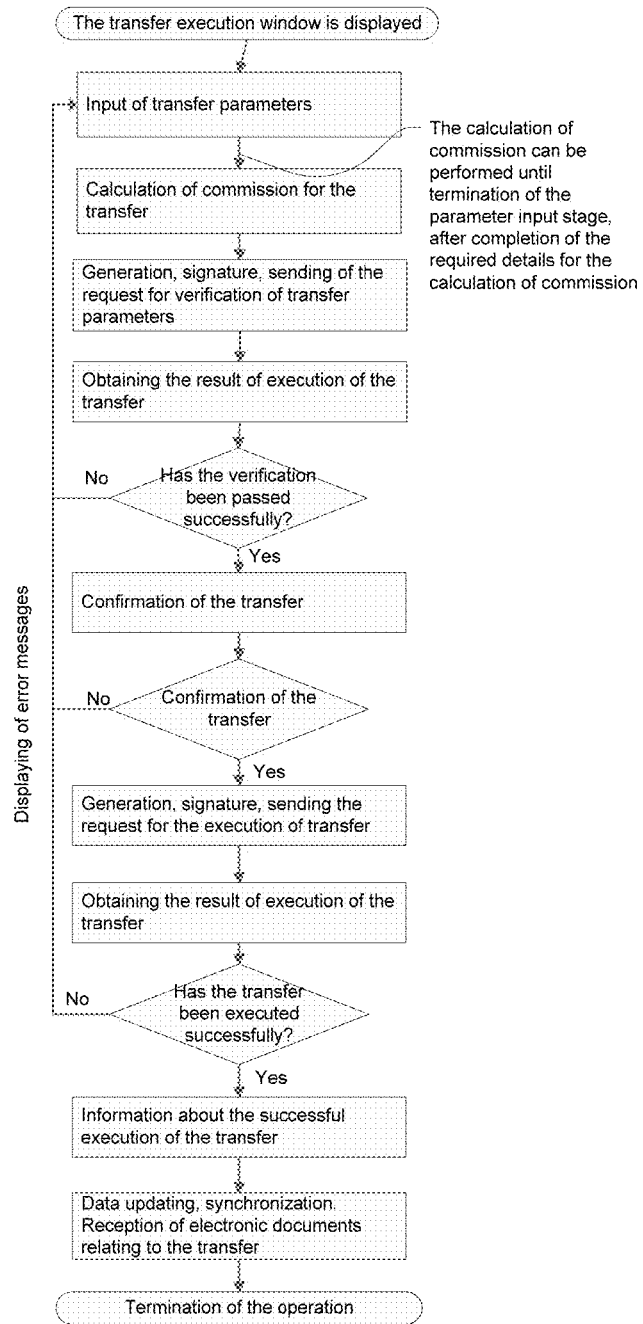
FIG. 7 Flow chart of the operating algorithm of the client K5 unit for parameter input and the implementation of transfers.

An example of the operating algorithm of the K5 unit for parameter input, execution of transfers is given in FIG. 7.

Implementations are possible whereby, in the course of input of transfer parameters, information about the transfer recipient is downloaded on the basis of the recipient's account number and displayed to the participant in order to minimize the risk of input of incorrect data.

The method can include a stage for the preliminary verification of transfer parameters, in the course of which the K5 unit will generate an electronic request for data verification and transmit it to the S4 server unit for verification of electronic check transfer parameters. The request includes the sender's account and transfer recipient's account numbers, value, currency of the transfer. In the course of checks, the S4 unit will determine whether the execution of transfer with the parameters specified is accessible. Execution of the S2 server unit is triggered, in the course of which the necessary verifications of both the sender (including a check of the request EHS) and the transfer recipient (including verification of the accessibility of the recipient's account) are performed. The retrieval of data from the DB about the electronic check available in the transfer sender's account, comparison of the nominal value of the check with the amount to be written off (implementations are possible, whereby the blocking of a separate amount in the account, followed by a comparison of the amount to be written off against the sum of accessible active balance occurs) and other checks provided by the peculiarities of the specific implementation of the System are performed. The checks shall be performed by collation with the information stored in the System database, checks of the account settings in the DB, execution of the algorithms of verification of the electronic digital signature.

The K5 client unit for parameter input and the execution of transfers receives information from the S4 unit about the results of check and displays to the user either a message on the resulting error, or a window with information on the transfer, which the customer shall repeatedly confirm. At this stage, the module can display any data on the transfer (amounts, payee's name, INN, etc.), corresponding implementations of the method.

Having received confirmation of the transaction from the participant, the K5 unit will generate an electronic request to execute the transfer containing the number of the account for write-off, the number of the invoice for placing checks in an account, amount, currency of transfer, purpose of payment, and will transfer it to the S5 server unit for the registration and execution of electronic check transfers.

Having received a request for execution of the transfer, the S5 unit will execute the transfer registration procedure. In the course of this procedure, in order to check the request received, transfer to the S4 unit is performed for verifying electronic check transfer parameters (all the data received are transferred), and after its successful execution, the information on the transfer will be recorded in the System database, the amount of commission will be calculated and recorded. In cases where the S4 unit returns an error, the transfer will not be registered, and the erroneous result of transfer execution will be returned to the K5 client unit (for example, state of the transaction, error code).

At the stage of the sending and registration of the transfer execution request, the unit for the generation and storage of digital documentation can be executed (S9). The method implies the inclusion of this unit either in the server application or in the client application. As a result of operation of this unit (in the given case, procedures for the generation of an application for execution of the transfer), a separate electronic document will be generated (for example, in pdf format), which contains all details of the application for electronic check transfer, and the Participant's EHS will be confirmed through the client unit of electronic signature of digital documentation (K17). The method implies various variants for storing this document, for example, the document can be transmitted to the server, saved along with EHS and other information in the application database and then become accessible to all stakeholders through specialized services of the server application.

In cases where the document has been generated on the server, the unit for the electronic signature of digital documentation (K17) shall implement the procedure for downloading electronic documents from the server.

Figure 8:
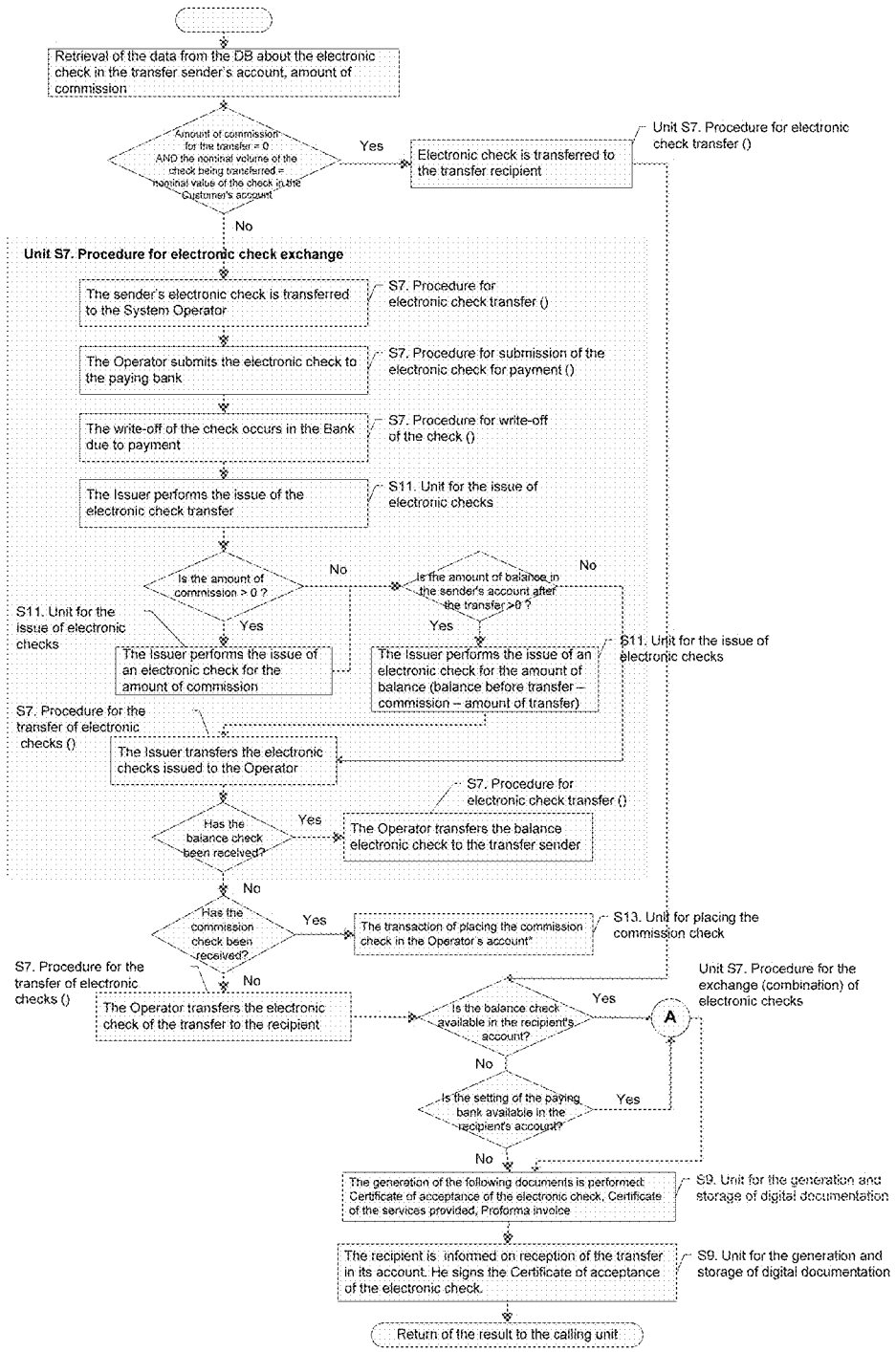
FIG. 8 Flow chart of the procedure for the execution of operations of the server S5 unit for registration and the implementation of electronic check transfers.

After the successful recording of the transfer in the server DB, the S5 unit will execute the transaction implementation procedure. An example of implementation of this procedure is given in FIG. 8. The input parameters for this procedure are all of the data received about the transfer being executed.

The S5 unit for the registration and execution of electronic check transfers receives data from the System database about the electronic check in the transfer sender's account and amount of commission ("Information about user accounts," "Information about electronic checks," "Information about electronic check transfers" sections).

If the nominal amount of the balance check on the sender's account coincides with the amount of transfer and, at that, the commission for transfer is not collected, the electronic check will be transferred from the sender's account directly to the recipient account.

For transferring a check, the S5 unit initiates execution of the S7 server unit for electronic check management. In doing so, the procedure for electronic check transfer is triggered, to whose input the following data are transmitted: number of the electronic check, number of the transfer sender's account, number of the transfer recipient's account. In implementing the procedure, the modification of information in the DB in the "Information on user accounts" is performed: the information about the check in the transfer sender's account will be removed, the data on the number of the balance check will be introduced into the account record; the information about the check holder will be modified in the "Information about electronic checks" section.

Within the framework of this procedure, the execution of the S8 unit is initiated for the registration of electronic check transactions in the Register. The input parameters upon triggering of the procedure for recording the check transfer transaction in the Register are as follows: number of the electronic check, number of the transfer sender's account, number of the transfer recipient's account, type of transaction ("check transfer"). Possible types of transactions in the Check Register are as follows: "check issue," "check transfer," "check submission for payment," "check submission for payment via collection," "payment of check," "check collection." On the basis of input parameters, the S8 units retrieves the necessary data from the DB, introduces records into the "Electronic check register" DB section containing at least the following information: number, date, time of transaction, amount, currency, number of the check being transferred, sender's account and recipient's account numbers, type of transaction, data on balances in the accounts. After successful recording of the transaction in the Check Register, the procedure for electronic check transfer of the S7 unit will be terminated.

Implementations are possible, whereby in a similar situation, when the whole nominal value of the check shall be transferred to the recipient, the electronic check will first be transferred to the Operator, and the Operator will transfer the check to the transfer recipient. The check transfer (as in all further references thereto) is carried out within the framework of the procedure for electronic check transfer of the S7 server unit for electronic check management described above.

If the aforementioned condition is not met (the nominal value of the check shall not be transferred to the recipient in full), the S5 unit will trigger the procedure for exchange of the electronic check of the S7 unit for electronic check management. The S5 unit transfers the following data to the input of this procedure: number of the electronic check whose nominal value is the balance in the sender's account, nominal values of the electronic checks into which the exchange shall be performed, equal to the amount of transfer and amount of commission to be collected for the transfer.

Within the framework of the procedure for electronic check exchange of the S7 unit, the sender's electronic check will be transferred to the System Operator (the procedure is executed for electronic check transfer of the S7 server unit for electronic check management, to whose input the following data are transferred: number of the electronic check, number of the transfer sender's account, number of the Operator's account).

The Operator submits the electronic check received for payment to the paying bank. Submission of the electronic check for payment is carried out by execution of the procedure for submission of the check for payment of the S7 unit for electronic check management, to whose input the following data are transferred: number of the electronic check, information about the bank (registration number), number of the account from which the check is presented (Operator's account). In implementing this procedure, the number of the specialized bank account is determined, to which the check will be transferred. Then the check transfer is performed similarly to the standard check transfer procedure. One difference is the change of the electronic check state in the System DB to the "submitted for payment" state ("Information about electronic checks" section) and the indication in the Check Register of the type of transaction: "submission of the check for payment" or "submission of the check for payment via collection" in case of execution of the S8 unit for registration of electronic check transactions in the Register. The type of transaction "submission of the check for payment via collection" is used when the bank to which the electronic check is being presented for payment and the paying bank for the given check do not coincide.

After successful execution of the procedure for submission of the check for payment, insofar as the bank to which the electronic check is submitted for payment and the paying bank for the given check coincide, the execution of the check write-off procedure of the S7 unit is triggered, to whose input the electronic check number is transferred. Within the framework of this procedure in the "Information about electronic checks" section, the data on the paid check will be changed, and the execution of the S8 unit for registration of electronic check transactions in the Register will be triggered. Within the framework of the procedure for recording the check write-off transaction in the Register in the "Electronic check register" section, a record will be introduced containing the following data: number, date, time of the transaction, value, currency, number of the check to be written off, number of the account to which the check being written off refers, type of transaction, data on the balance in the given account. Execution of the electronic check write-off procedure is only possible in case of payment of the check and the transmitting of real monetary funds equal to the nominal value of the check to its bearer or in case of set-off of the monetary funds released with payment of the check upon the purchase of new electronic checks with the System Issuer by the person that has submitted the check for payment.

After successful recording of the transaction in the Check Register, the procedure for electronic check write-off of the S7 unit will be terminated.

Using the funds received (released), the Operator will buy new checks of the required nominal values from the Issuer:
Check for the amount of transfer.
Check for the amount of the commission (can be equal to 0, in which case no check will be issued).
Check for the amount of balance (balance can be equal to 0, in which case no check will be issued).

To this end, the S7 unit, within the framework of the electronic check exchange procedure, triggers sequentially the execution of the S11 unit for electronic check issue for each of the checks in question. Data shall be transferred to the input of this unit on details of the new checks, which at least include the following: nominal value, check currency, data on the paying bank. As the payer for new checks, the paying bank for the check transferred for exchange will be indicated.

In implementing the S11 unit, the necessary data are retrieved from the system DB for indication of all check details, the execution of the S12 unit for electronic check signature is triggered (whereby check signature on behalf of the Issuer is created by means of execution of the electronic digital signature algorithms), and a record on the new electronic check will be created in the "Information about electronic checks" DB section.

In implementing the electronic check issue, the S11 unit will cause the execution of the procedure for recording the check issue transaction of the S8 unit for registration of electronic check transactions in the Register. As the input parameters in cases where this procedure is triggered, the following data are transferred: number of the electronic check, number of the account to which the issued check will be referred to (Issuer's account), type of transaction ("check issue"). Within the framework of this procedure, a record shall be introduced into the "Electronic check register" DB section containing the following data: number, date, time of the transaction, value, currency, number of the issued check, type of transaction, number of the account to which the issued check will be referred, data on the balance in the given account. After successful recording of the transaction in the Check Register, the operation of the S11 unit for electronic check issue will be terminated for the check for which unit execution has been triggered.

After successful termination of operation of the S11 unit, the issued checks will be transferred to the Operator (in accordance with the procedure for electronic check transfer of the S7 unit for electronic check management).

If the balance check has been issued successfully, the Operator will transfer this check to the transfer sender. After successful termination of this action, the procedure for electronic check exchange will be terminated for the transfer sender's check.

Figure 9:
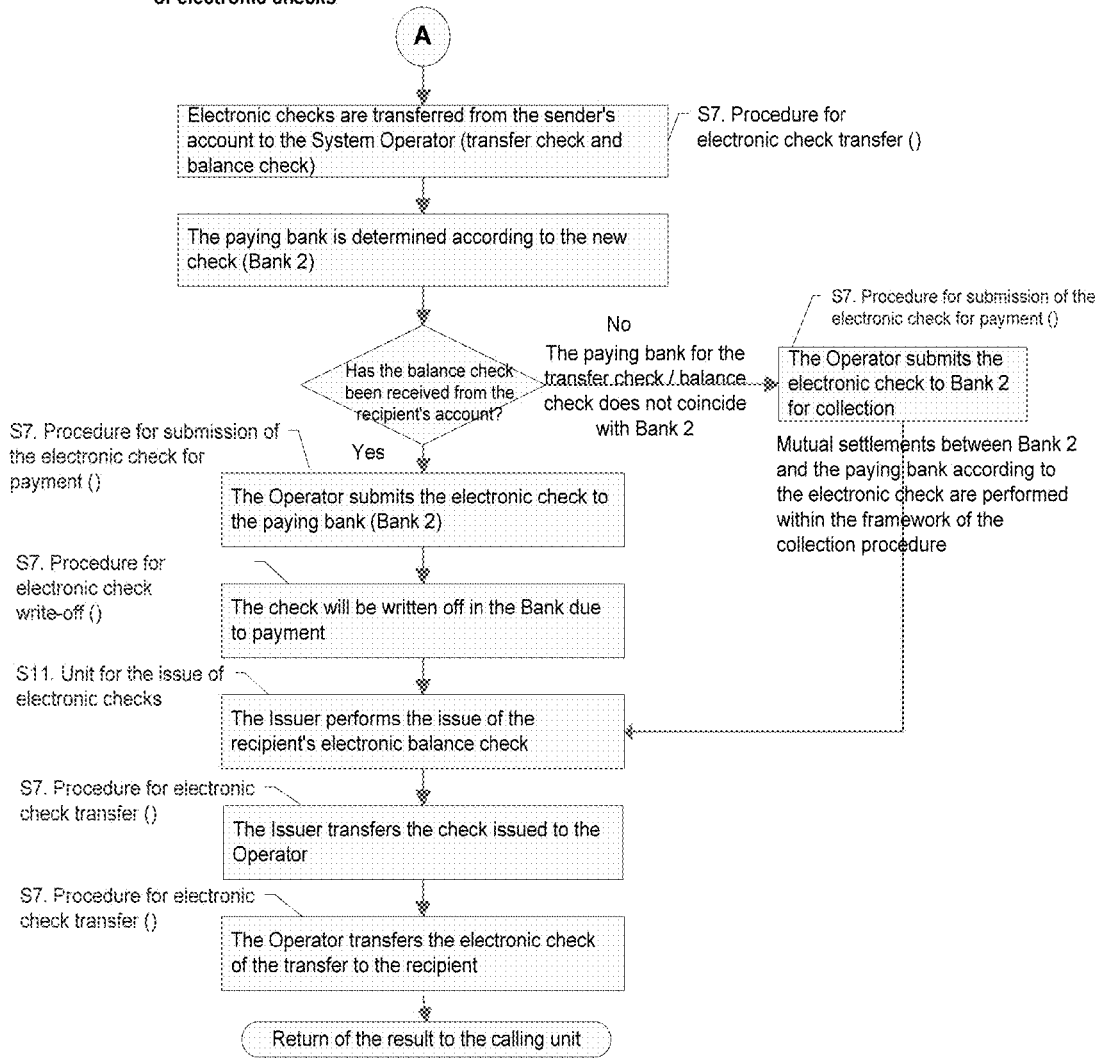
FIG. 9 Flow chart of the procedure for the exchange (combination) of electronic checks of the server S7 unit for electronic check management.
Figure 10:
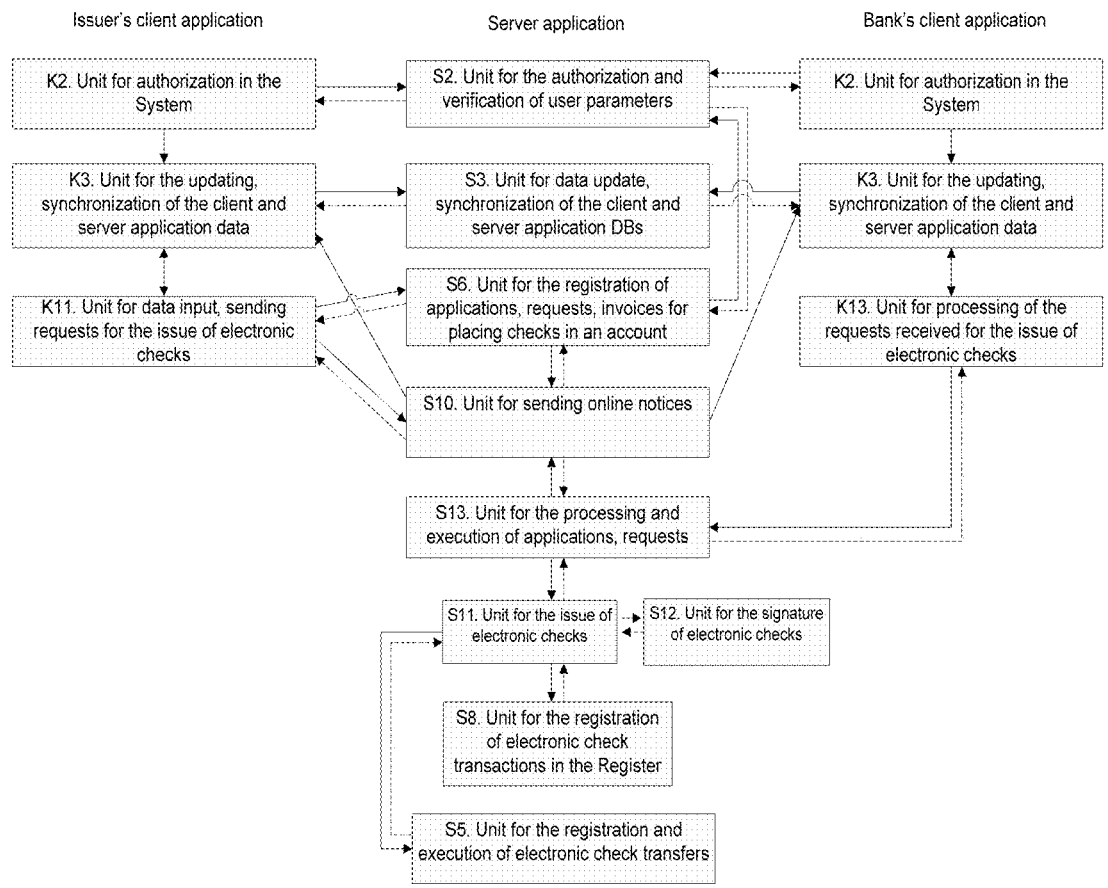
FIG. 10 Diagram of unit interaction in implementing the electronic check issue procedure.
Figure 11:
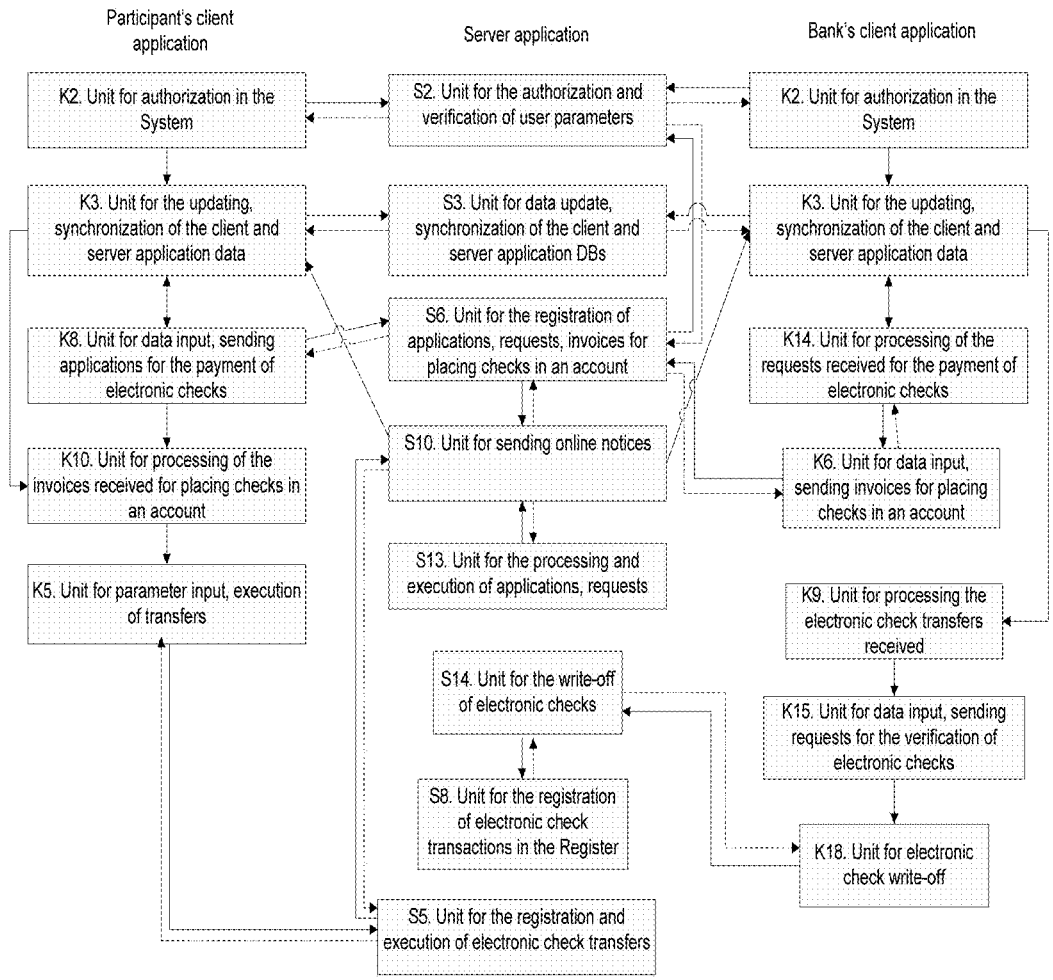
FIG. 11 Diagram of unit interaction in implementing the electronic check payment procedure.
Figure 12:
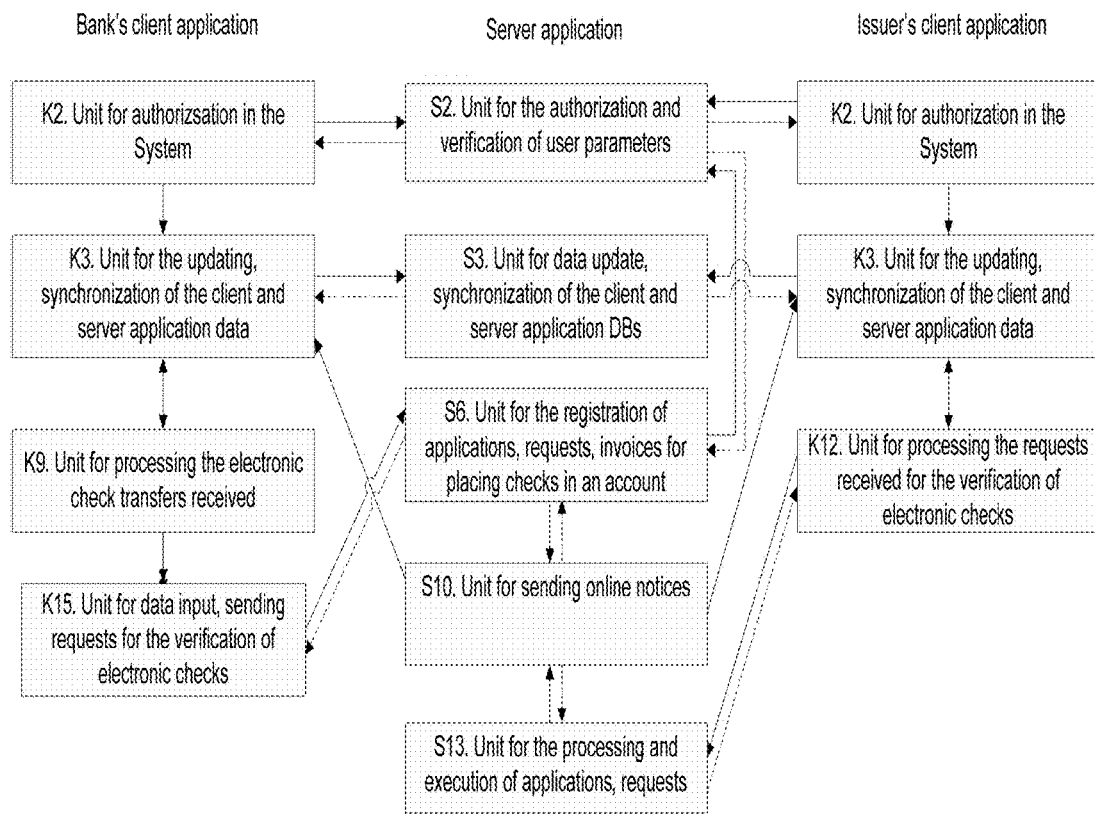
FIG. 12 Diagram of unit interaction in implementing the electronic check verification procedure.

Within the framework of operation of the S5 unit, the Operator will transmit a check for the amount of transfer to the recipient's account. From the database ("Information on user account" section), the S5 unit will retrieve information on the balance in the transfer recipient's account and account settings. In cases where there is a balance check in the recipient's account or a bank different from the paying bank for the transfer check is specified in the settings of the given account, the S5 unit will trigger the procedure for electronic check exchange (combination) of the S7 unit for electronic check management (FIG. 9). Within the framework of this procedure, the electronic checks (check) shall be transferred from the recipient's account to the System Operator's account.

The Operator shall submit the electronic checks (check) received for payment to the bank specified as the paying bank according to the transfer recipient's "balance check," or to the Bank specified in the settings of the account in cases where the balance is missing. Apart from the information provided, other methods are possible for determination of the bank which will be the payer according to the new check of the transfer recipient, for example, instead of using the account settings and data of the current balance check, a paying bank can be selected according to the electronic check with a larger nominal value.

The submission of checks to the Bank for payment shall be performed within the framework of the procedure for submission of the check for payment of the S7 unit for electronic check management.

Check submission for payment to a bank different from the bank specified as the paying bank for the given check shall be carried out in accordance with the mechanism of check presentation for collection. This procedure guarantees the availability of a sufficient amount of monetary funds in the Issuer's settlement accounts in partner-banks acting as security for the checks issued by the Issuer.

For the electronic check submitted for payment to the paying bank (in the implementation being described, the balance check from the transfer recipient's account), execution of the standard check write-off procedure of the S7 unit for electronic check management is triggered.

Using the released funds, the Operator acquires a new check from the Issuer, whose nominal value is equal to the sum of nominal values of the checks submitted for exchange (or equal to the nominal value of the check submitted for exchange to the check of another paying bank).

To this end, the S7 unit, within the framework of the procedure for electronic check exchange (combination), triggers the execution of the S11 unit for electronic check issue, transferring to its input the nominal value, currency of the check (equal to the currency of checks to be combined), and data on the paying bank. The payer for the new check will be the bank that has performed payment of the checks submitted for exchange.

The Issuer shall transfer the issued check to the System Operator. The Operator shall transfer the new check to the transfer recipient. After the successful implementation of these actions, the procedure for electronic check exchange (combination) will be terminated.

Implementations are possible whereby the exchange of transfer of the sender's checks is not performed, and the record-keeping of any number of electronic checks is maintained in the recipient's account. For example, in the implementation being described, the procedure for the exchange of electronic checks is not executed if the transfer implementation is carried out within the framework of check submission for payment and the check is transferred to a specialized bank's account.

In cases where a commission is collected for the transfer, the S5 unit will trigger the execution of the S13 unit for placing the commission check in an account. In the implementation being described, if there is a balance check in the Operator's account or a bank differing from the paying bank for the commission check is indicated in the settings of the Operator's account, the S13 unit will also initiate the execution of the procedure for electronic check exchange (combination) of the S7 unit for electronic check management, in the course of which a new check including the amount of commission for the completed transfer shall be placed in the Operator's account. The order of exchange of the operator's electronic checks is similar to the exchange of the transfer recipient's check exchange, except transactions involving check transfer to the Operator and reception of the check from the System Operator. It is also necessary to take into account that if the check transfer is performed via a dealer (broker), then a commission shall be charged in the S13 unit to the Dealer (Broker) acting as an intermediary in the implementation of transfer rather than to the Operator. Check exchange transactions are always performed via the Operator, irrespective of the recipient of commission.

In implementing the procedure for execution of the transaction of the S5 unit for the registration and execution of electronic check transfers, the execution of the S9 unit is triggered for the generation and storage of digital information. As a result of operation of this unit, on the basis of the information about the transfer parameters being received, digital reporting documentation is created for the purposes of its signature by Participants' EHS and providing the possibility of further printout.

In the implementation being described, in the course of operation of the S9 unit, the following documents are generated: Certificate of acceptance of the electronic check, Certificate of the services provided, pro form a invoice. Documents stemming from execution of the K17 unit for the electronic signature of digital documentation are signed with the EHS of the corresponding parties.

After successful execution of the transfer and generation of the required documentation, the S5 unit will initiate the execution of the S10 unit for sending online notices. Information about the transfer recipient and type of message being sent is transmitted to the input of this unit. As a result of execution of this unit, the execution of the K3 unit is triggered for updating, synchronization of client and server application data. After receiving information about the transfer, execution of the K17 unit can be triggered for the electronic signature of digital documentation for the purposes of signature of the Certificate of acceptance of the check by the transfer recipient.

Under termination of operation of the S5 unit for the registration and execution of electronic check transfers, a message is generated with the result of the transaction, which is transmitted to the K5 unit for parameter input, execution of transfers and storage of information about payments of the transfer sender's application. Implementations are possible (operating modes of applications) whereby the procedure of execution of transaction of the S5 unit for the registration and execution of electronic check transfers is not executed in online mode, i.e. after successful termination of the procedure for registration of the transfer of the S5 unit, a message will be sent at once to the transfer sender (K5 unit) about the fact that the transfer has been received by the System, and the transaction execution procedure is performed later.

In cases of reception of the message about termination of the transaction, the K5 unit for parameter input, execution of transfers and storage of information about payments of the transfer sender displays information about the result of transfer to the user, triggers execution of the K3 unit for updating, synchronisation of client and server application data, upon whose operation termination the updating of information about the current balance in user accounts is carried out.

Method of Electronic Check Issue

Below, the method is presented for electronic check issue to be used in situations different from transactions involving the automatic exchange of electronic checks in the implementation of transfers. This method is aimed at ensuring the safety of the process of the reception of new checks for circulation issued using real monetary funds received in the issuer's settlement account, for example, in purchasing checks by a dealer (broker), rather than using payment for other electronic checks.

The beginning of the process of electronic check issue is the launch of the client application by the user with the Issuer's account, in the course of which the client K2 unit for authorization in the System is initialized, after which execution the K3 unit will be started for updating, synchronization of client and server application data. Successful execution of the K2 and K3 units is an obligatory condition for transfer to the K11 unit for data input and the sending of requests for the issue of electronic checks. For initialization of this unit, the Issuer shall select the corresponding section in the user interface of the client application.

The K11 unit provides the user with the possibility of input of the required initial data for generating a request for the issue of an electronic check. This unit can provide various possibilities for entering the request parameters, e.g. direct input of parameters, selection of parameter variants from the lists of possible values (selection from the list of paying banks), generation of the request on the basis of the check purchase request received from the dealer (broker).

The obligatory parameters of the request to issue an electronic check are the Issuer's details (registration number, description, etc.), nominal value, currency of the check being issued, paying bank, number of the Issuer's settlement account in which payment for the check will be placed, data on the check buyer and payer (name, INN, registration number, data on the purchase application, buyer's account for placing the check in an account). After the Issuer's correct completion of all required parameters of the request, the K11 unit will generate a request to issue a check in the form of an electronic document certified with the Issuer's EHS. The K11 unit will transmit the request to the S6 server unit for the registration of applications, requests, invoices for placing checks in an account.

The S6 unit executes the procedure for verification of the request to issue a check; execution of the S2 server unit is triggered, in the course of which the necessary verifications are carried out of both the sender (including verification of the request EHS) and the request recipient. In case of successful fulfillment of all verifications, the request will be registered on the server. The records will be introduced into the DB in the "Information about applications, requests, accounts for placing checks in the account" section. A message on the availability of a new request will be sent to the Recipient (paying bank for the check being issued) by means of the S10 unit for sending online notices.

Upon entry into the Bank System or in case of an online notice being received, the K3 unit (update, synchronisation of client and server application data) for the Bank's client application by means of interaction with the S3 unit will download a request from the server to issue the electronic check.

In doing so, the S3 server unit for data update and synchronization of client and server application DBs will perform verification of the fact that request downloading is being carried out solely by the recipient with the "Bank" status specified in the request.

After successful reception of the request, triggering of the K13 unit for the Bank's client application is performed for processing the requests received to issue electronic checks. The K13 unit will display the information in the user interface about the check issue request and provide an option to the Bank to decline or confirm the request.

Having received the request, the Bank verifies the availability of payment for the check being issued that has been received from the payer indicated in the request for electronic check issue, compares the data in the Issuer's request (for example: nominal value of the check, currency, number of the check purchase application, payer's details) with the data from the Issuer's account statement. In cases where monetary funds for purchase of the check are received in the Issuer's account, the Bank, through the client application, will confirm the Issuer's Request. In doing so, the K13 unit for processing received requests for electronic check issue shall generate electronic confirmation of the request and transfer it to the S13 server unit for the processing and execution of applications, requests.

The S13 unit, in the course of the procedure for confirmation of the application for the issue of an electronic check, will retrieve data from the DB about the request to issue the check being confirmed and perform the necessary verifications (including the triggering of the K2 unit for verification of the Bank's account); after their successful completion, execution of the S11 unit is triggered for the issue of electronic checks. Data on the details of the new check received from the request for issue are transmitted to the input of this unit, which include the following: nominal value, check currency, data on the paying bank. A description of the S11 unit is given above (see Method for the execution of electronic check transfers).

Upon the successful termination of operation of the S11 unit, the S13 unit, in the course of the procedure for confirmation of the application to issue the electronic check, triggers execution of the S5 unit for the registration and execution of electronic check transfers (transfer registration procedure) for the purposes of the automatic creation and execution of transfer of the check issued from the Issuer's account to the check buyer's account. Data from the application for issuing the electronic check retrieved from the DB, i.e. recipient's account, nominal value, check currency, etc., shall be transferred to the input of the procedure for registration of the transfer of the S5 unit.

After termination of operation of the procedure for registration of the transfer of the S5 unit, the procedure shall be executed for implementation of the operation of the S5 unit (in accordance with the sequence given above).

The S13 unit will transmit the successful result of processing the request to the K13 client unit of the Bank's application, which records the updated state of the processed request for check issue as well as, through the S10 unit, to the client application of the sender of the check issue request (Issuer) (to the S3 unit for data update, synchronization of client and server application DBs, which updates and displays to the Issuer the updated state of the request and information about the automatic transfer of the check to the buyer).

Method of Payment of Electronic Checks

Below, a method is presented for the payment of electronic checks to be used in situations where the check is submitted to the bank for the purposes of receiving real monetary funds according to the check in the bearer's settlement account. This method is aimed at ensuring the safety of the process of receiving payment according to the check, both on the part of the check bearer and on the part of the bank performing payment.

The beginning of the process of submission of the electronic check for payment shall be the user's launch of the client application, in the course of which the K2 client unit for authorization in the System is initialized, after which execution of the K3 unit will be launched for the updating and synchronization of client and server application data. The successful execution of the K2 and K3 units is an obligatory condition for transfer to the K8 data for data input, sending the applications for the payment of electronic checks. The K8 unit can be accessible to various user categories (for example, only to legal entities with a higher status in the System than initial).

For initialization of this unit, the System Participant selects the corresponding section in the user interface of the client application.

The K8 unit provides the user with the possibility of input of the required initial data for generating an application for electronic check payment, such as the account from which the check write-off will be carried out, nominal value of the check, bank details for placing the payment. On the basis of the data entered by the user, the K8 unit determines the bank acting as the payer according to the Participant's check.

Following correct completion of the obligatory details of the application, the K8 unit will generate the application for payment of the electronic check in the form of an electronic document certified with the user's EHS. The K8 unit transfers the application to the S6 server unit for the registration of applications, requests, accounts for placing checks in an account.

The S6 unit will execute the procedure for verification of the application for payment of the electronic check—execution of the S2 server unit is triggered, in the course of which the necessary verifications are carried out with respect to both the sender (including verification of the request EHS) and the request recipient, and verification of the correctness of the bank details of the customer for placing the payment (in particular, according to the applicable bank reference book according to BIC) and the sufficiency of funds in the sender's account is executed, along with the other verifications necessary for proper execution of the transaction.

In case of the successful fulfillment of all verifications, the application will be registered on the server. The records will be introduced into the DB in the "Information about applications, requests, accounts for placing checks in an account" section. A message will be sent about the availability of the new application to the recipient (paying bank) by means of the S10 unit for sending online notices.

When the Bank enters into the System or in case of the reception of an online notice, the K3 unit (updating, synchronization of client and server application data) of the Bank's client application, by means of interaction with the S3 unit, downloads the application for payment of the electronic check from the server. In doing so, the S3 server unit for data update, synchronization of client and server application DBs performs verification of the fact that request downloading is being carried out solely by a recipient with the "Bank" status specified in the request.

After successful reception of the request, triggering of the K14 unit of the Bank's application is performed for processing the applications received for the payment of electronic checks. The K14 unit will display the information about the application for payment of the electronic check in the user interface and provide the Bank with the option to decline or confirm the application.

Having received the application, the Bank will verify the correctness of the Application parameters, accessibility of the necessary amount of funds in the Issuer's settlement account. Confirmation of the application shall be an invoice issued through the System for placing the check in an account.

The Bank issues the invoice by means of execution of the K6 client unit for data input, sending invoices for placing checks in an account. In the course of execution of this unit, an invoice will be generated whose parameters are determined on the basis of the application for payment of the check and partially completed by the Bank. The Bank shall specify the details of its account allocated for checks to be submitted for payment. As the basis for the invoice, it is necessary to specify the number of the application for payment of the check and indicate the bank details of the check bearer for placing the payment.

Following the correct completion of invoice details, the K6 unit will generate the invoice to place the check in an account in the form of an electronic document certified with the user's EHS. The K6 unit will transfer the invoice to the S6 server unit for the registration of applications, requests, invoices for placing checks in an account.

The S6 unit executes the procedure for verification of the parameters of the invoice for placing checks in an account—execution of the S2 server unit is triggered, in the course of which the necessary verifications are performed of both the sender (including verification of the request EHS) and the request recipient. In case of the successful fulfillment of all verifications, the invoice will be registered on the server. The records are introduced into the DB in the "Information about applications, requests, invoices for placing checks in an account" section. A message on the availability of the new invoice will be sent to the Recipient by means of the S10 unit for the sending of online notices.

Following successful issue of the invoice, the K14 unit of the Bank's client application for the processing of applications received for the payment of electronic checks will execute the update of application state. To this end, the corresponding notice shall be sent to the S13 server unit for the processing and fulfillment of applications, requests, in the course of which the new state of the application will be recorded in the server DB and a notice will be sent to the sender.

In cases where the Application cannot be satisfied (the check bearer has not passed the necessary verifications), the Bank will select the "Decline the application" option and indicate the basis for the denial. In doing so, the K14 unit for the processing of applications received for the payment of electronic checks will send a command to the S13 server unit for the processing and execution of applications, requests (the procedure for denial of payment by the S13 unit is triggered). In the course of execution of this procedure, data on the application being declined will be retrieved from the DB, the necessary verification will be performed and the triggering of the S9 unit for the generation of digital documentation will be carried out (procedure for generation of the Notice on refusal to pay the check). Data on the customer, bank, currency of the check being paid as well as the basis for refusal shall be sent to the input of this procedure. The document, due to execution of the K17 unit for the electronic signature of digital documentation, will be signed with the Bank's EHS. The S13 unit will notify the customer of the change in the state of the application being sent by the customer.

The Participant, having received the aforementioned invoice to place the check in an account, will execute a transfer to the bank into the specialized account in the System specified. The execution of transfer is carried out in accordance with the method described above for the execution of electronic check transfers.

The Bank, having received the transfer (K9 unit for the processing of received electronic check transfers), will perform verification of the fact that the check bearer's details specified in the purpose of payment, number of the application and other parameters of the transfer conform to the parameters of the confirmed check payment application and initiate the procedure for verification of the electronic check received. The method for electronic check verification is described below.

Only when the Notice on verification of the check and change in the state of the Request for verification in the System to "confirmed" has been received will the bank perform payment of the check by transferring the respective monetary funds to the Participant's settlement account (and if the Participant is a credit organization, then to its correspondent account) and write off the check.

The process of write-off of an electronic check occurs upon selecting the corresponding options in the user interface of the Bank's application. In doing so, the execution of the K18 unit for electronic check write-off is triggered. The K18 unit, on the basis of the confirmed request for verification, will generate an electronic request to write off the electronic check containing the number of the request for verification, certify it with the Bank's EHS and send it to the S14 server unit for the write-off of electronic checks. The K18 unit can additionally include execution of the stage of the Bank's input of the parameters of the payment order on whose basis the transfer of real monetary funds will be carried out to the check bearer.

The S14 server unit for the write-off of electronic checks executes the stage of verifications, in the course of which the data on the request confirmed for verification of the check are retrieved from the DB; the K2 unit is triggered for verification of the Bank's account and request EHS, and verification of the electronic check being written off is executed. After successful completion of all verifications, the S14 unit will carry out write-off of the check, and the corresponding changes will be introduced into the DB in the "Information about electronic checks" section (the electronic check state and other required parameters will be changed).

In implementing the write-off of the electronic check, the S14 unit triggers execution of the procedure for recording the check write-off transaction of the S8 unit for the registration of operations with electronic checks in the Register. As the input parameters in cases where this procedure is triggered, the following data will be transferred: number of the electronic check, number of the account in which the check being written off was placed, type of transaction ("check write-off (paid)"). Within the framework of this procedure, a record containing the following data will be introduced into the "Electronic check register" DB section: number, date, time of transaction, value, currency, number of the check being written off, type of transaction, number of the account to which the check refers, data on the balance in the given account.

After successful recording of the transaction in the Check register, the S14 unit performs updating of the state of application for check payment, request for verification (into "payment of the check has been performed"). The corresponding notices shall be sent to System participants by means of the S10 unit.

Method for the Verification of Electronic Checks

The method for verification of the electronic check enables the Bank to receive confirmation of the authenticity of the check to be submitted for payment and shall be an obligatory stage preceding payment of the check.

The verification process begins when the Bank, having received the electronic check transfer to the specialized account with an indication of the data in the purpose of payment on the application for payment of the check, generates a Request for verification of payment of the submitted electronic check.

In the bank's selection of the "Request for verification" option, execution of the K15 unit for data input and sending of requests for electronic check verification will be initiated. The K15 unit will provide the bank with the possibility of automatic completion of the parameters of the request on the basis of the transfer received. The request for verification contains data on the electronic check as well as on the person that has submitted the check for payment.

The K15 unit will certify the request completed in the form of an electronic document with the Bank's EHS and send it to the S6 server unit for the registration of applications, requests, invoices for placing checks in an account.

The S6 unit executes the procedure for verification of the parameters of the request for verification of the electronic check, which includes automatic verification of the electronic check details, in the course of which the check EHS is verified (the algorithm of verification of the electronic digital signature will be executed with the use of the Issuer's public key and record on the check in the DB, which guarantees the invariability of all details of the electronic check), as are the current state of the electronic check and the request sender's account (execution of the S2 server unit is triggered).

In case of the successful execution of all verifications, the S6 unit will determine the Issuer's registration number and save the request on the server. The records will be introduced into the DB in the "Information about applications, requests, accounts for placing checks in an account" section. A message on the availability of the new request will be sent to the Recipient (Issuer) by means of the S10 unit for the sending of online notices.

When the Issuer enters into the System or in case of the reception of an online notice, the K3 unit (updating, synchronization of client and server application data) of the Issuer's client application, by means of interaction with the S3 unit, downloads the request for verification of the electronic check from the server. In doing so, the S3 server unit for data update, synchronization of client and server application DBs performs verification of the fact that request downloading is being carried out solely by the recipient with the "Issuer" status specified in the request.

Following successful reception of the request, triggering of the K12 unit of the Issuer's client application is performed for processing the requests received for verification of electronic checks. K12 unit will display the data in the user interface on the request for verification of the electronic check and provide the Issuer with an option to decline or confirm the request.

The Issuer, having received the Request for verification, will trace the electronic check history with the use of the Check Register—verify the correctness of the check details (the System provides the possibility of viewing the electronic check in graphical form), reliability of the data on the check bearer.

If all of the verifications have been performed successfully, the Issuer will confirm the Request for verification of the check.

In doing so, the K12 unit for processing of the requests received for payment of electronic checks will send the request to the S13 server unit for the processing and execution of applications, requests (the procedure for confirmation of the request for verification of the check of the S13 unit will be triggered). In the course of execution of this procedure, the data on the confirmed request will be retrieved from the DB, the necessary verifications will be performed and the triggering of the S9 unit for the generation of digital documentation will be carried out (procedure for generating the Notice on electronic check verification). The data on the electronic check received on the basis of the request for verification will be transferred to the input of this procedure. The document will be signed by the Issuer's EHS due to execution of the K17 unit for the electronic signature of digital documentation. The S13 unit will notify the Bank about the change in the state of the application sent by the Bank.

In cases where the Request cannot be confirmed, the Issuer will select the "Decline the request" option and specify the basis for refusal. Denial of the request occurs similarly to refusal of the application for check payment by the Bank.

The invention claimed is:

1. A method for securely processing data for electronic check transfers in an electronic check settlement system comprising a server computer device connected to a client computer device, wherein the server computer device is connected to the client computer device via at least an Internet network, the server computer device and the client computer device each comprising an encryption module for secure communication over the Internet network, said method comprising:

establishing, via the Internet network, a secure communication channel between the respective encryption modules of the server computer device and the client computer device, wherein:

the respective encryption modules of the server computer device and the client computer device each include firmware, and wherein the firmware included in the encryption module of the server computer device comprises:

a server unit for authorization and verification of user parameters, a server unit for electronic check management, a server unit for electronic check issue, a server unit for registration of electronic check transfers, and a server unit for sending online notices;

receiving, by the server computer device via execution of the server unit for authorization and verification of user parameters and from the client computer device via the secure communication channel authorization information for a sender;

executing, by the server computer device via execution of the server unit for authorization and verification of user parameters, authorization of the sender based on the authorization information;

after receiving the authorization information for the sender from the client computer device and executing authorization of the sender based on the authorization information receiving, by the server computer device and from the client computer device, encrypted data representative of:

account information associated with the sender; and electronic check transfer parameters associated with an electronic check of the sender, wherein the electronic check of the sender is associated with the account information, and wherein the electronic check transfer parameters include a request for execution of an electronic check transfer and an indication of a recipient;

verifying, by the server computer device via execution of the server unit for electronic check management, the electronic check parameters using an electronic signature based verification procedure;

registering, by the server computer device, the request for execution of the electronic check transfer;

based on the electronic check transfer parameters, processing, by the server computer device, the electronic check of the sender into a plurality of checks by:

producing, by the server computer device via execution of the server unit for electronic check issue, the plurality of checks, the plurality of checks including: an electronic transfer check, an electronic commission check, and an electronic balance check, and recording, by the server computer device via execution of the server unit for registration of electronic check transfers, the processing of the electronic check of the sender into the plurality of checks;

processing, by the server computer device via execution of the server unit for electronic check management, the plurality of checks including: the electronic transfer check, the electronic commission check, and the electronic balance check based on the electronic check transfer parameters by:

electronically depositing the electronic transfer check in an electronic account of the recipient, electronically depositing the electronic commission check in one of: an electronic account of a system operator and an account of a system broker, and electronically depositing of the electronic balance check into an electronic account of the sender based on the account information associated with the sender; and transmitting, by the server computer device via execution of the server unit for sending online notices, a transaction notification to at least one of the sender and the recipient, wherein the transaction notification confirms the execution of the electronic check transfer.

2. The method according to claim 1, further comprising verifying, by the server computer device, the account information by assigning a category to the account information, the category representing permissions that the sender has within the electronic check settlement system.

3. The method according to claim 1, further comprising, in response to the receiving, by the server computer device, the authorization information for the sender from the client computer device:

sending, by the server computer device, to the client computer device at least the account information associated with the sender; and wherein the client computer device displays at least the account information associated with the sender, the account information including at least information relating to at least the electronic account of the sender, including information representative of at least one of:

an electronic account number, a description of the electronic account, an indication of an active balance in the electronic account, a number of the electronic check referenced to the electronic account, and data on a bank associated with the electronic account.

4. The method according to claim 1, further comprising, when verifying, by the server computer device, the electronic check parameters results in a negative response:

generating an error message; and transferring the error message to the client application.

5. The method according to claim 1, further comprising:

calculating, by the server computer device, a sum of a commission to be collected, the calculating being based on an indication of an amount contained in the electronic check parameters, the sum of the commission being used to generate the electronic commission check;

generating, by the server computer device, at least one message related to the sum of the commission; and transmitting, by the server computer device, the electronic commission message to the client computer device.

6. The method according to claim 5, wherein said step of calculating, by the server computer device, the sum of the commission to be collected is performed based on at least one of:

local data stored in a random-access memory of the server computer device; and a rate of commission that has been pre-set in the server computer device.

7. The method of claim 5, wherein said processing, by the server computer device, the electronic check of the sender into the plurality of checks allows for the recipient to deposit an amount that is lower than a nominal value of the electronic check in the electronic account of the recipient; and wherein:

the electronic transfer check is representative of the amount to be deposited in the electronic account of the recipient;

the electronic commission check is representative of the sum of the commission; and the electronic balance check is representative of an amount to be electronically deposited back into the electronic account of the sender.

8. The method according to claim 1, wherein:
the electronic check parameters further include an amount to be transferred; and
the method further comprises:
comparing, by the server computer device, the amount to be transferred against an amount available in the electronic account; and
blocking, by the server computer device, a reserve amount in the electronic account of the sender account, the reserve amount being sufficient to cover the amount to be transferred.

9. The method according to claim 1, wherein:

the electronic check parameters further include an amount to be transferred; and the method further comprises:

comparing the amount to be transferred against an amount available in the electronic account; and responsive to the amount to be transferred at least matching the amount available in the electronic account, electronically depositing, by the server computer device, the electronic transfer check in the electronic account of the recipient.

\* \* \* \* \*